United States Patent [19]
Kreitzer

[11] Patent Number: 5,963,375
[45] Date of Patent: Oct. 5, 1999

[54] ATHERMAL LCD PROJECTION LENS

[75] Inventor: Melvyn H. Kreitzer, Cincinnati, Ohio

[73] Assignee: U.S. Precision Lens Inc., Cincinnati, Ohio

[21] Appl. No.: 08/788,207

[22] Filed: Jan. 24, 1997

Related U.S. Application Data

[60] Provisional application No. 60/010,901, Jan. 31, 1996.

[51] Int. Cl.$^6$ .............................. G02B 9/34; G02B 13/18
[52] U.S. Cl. ........................... 359/650; 359/715; 359/781
[58] Field of Search ...................... 359/781, 649, 359/650, 713, 714, 715

[56] References Cited

U.S. PATENT DOCUMENTS

| | | | |
|---|---|---|---|
| 4,189,211 | 2/1980 | Taylor | 359/663 |
| 4,425,028 | 1/1984 | Gagnon et al. | 353/31 |
| 4,461,542 | 7/1984 | Gagnon | 359/495 |
| 4,826,311 | 5/1989 | Ledelbuhr | 353/31 |
| 5,042,929 | 8/1991 | Tanaka et al. | 359/708 |
| 5,179,473 | 1/1993 | Yano et al. | 359/691 |
| 5,200,861 | 4/1993 | Moskovich | 359/662 |
| 5,218,480 | 6/1993 | Moskovich | 359/749 |
| 5,278,698 | 1/1994 | Iizuka et al. | 359/682 |
| 5,313,330 | 5/1994 | Betensky | 359/676 |
| 5,331,462 | 7/1994 | Yano | 359/651 |
| 5,625,495 | 4/1997 | Moskovich | 359/649 |

FOREIGN PATENT DOCUMENTS 311116  4/1989  European Pat. Off. .

OTHER PUBLICATIONS

*The Handbook of Plastic Optics*, U.S. Precisions Lens, Inc., Cincinnati, Ohio, 1983, pp. 17–29.

Primary Examiner—Scott J. Sugarman
Attorney, Agent, or Firm—Maurice M. Klee

[57] ABSTRACT

A four element, athermalized projection lens for use in forming an enlarged color image of a LCD panel is disclosed. The powers of the elements from the screen to the LCD are negative/positive/negative/positive and the dispersions are low dispersion/low dispersion/high dispersion/low dispersion. The first three elements are composed of plastic and the last element is composed of glass. The projection lens exhibits a high level of aberration correction over magnifications ranging from about 5× to about 12×. The four element design comprises the minimum number of elements capable of achieving a relatively long back focal length, athermalization, and lateral color correction of less than about half a pixel.

16 Claims, 33 Drawing Sheets

ATHERMAL LCD PROJECTION LENS

CROSS REFERENCE TO RELATED PROVISIONAL APPLICATION

This application claims the benefit under 35 USC §119(e) of U.S. Provisional Application Ser. No. 60/010,901, filed Jan. 31, 1996.

FIELD OF THE INVENTION

This invention relates to projection lenses and, in particular, to projection lenses which can be used, inter alia, to form an image of an object composed of pixels, such as, a liquid crystal display (LCD).

BACKGROUND OF THE INVENTION

Projection lens systems (also referred to herein as "projection systems") are used to form an image of an object on a viewing screen. The basic structure of such a system is shown in FIG. 4, wherein 10 is a light source (e.g., a tungsten-halogen lamp), 12 is illumination optics which forms an image of the light source (hereinafter referred to as the "output" of the illumination system), 14 is the object which is to be projected (e.g., a matrix of on and off pixels of a LCD panel), and 13 is a projection lens, composed of multiple lens elements, which forms an enlarged image of object 14 on viewing screen 16.

Projection lens systems in which the object is a LCD or other pixelized panel are used in a variety of applications, including data display systems. Such projection lens systems preferably employ a single projection lens which forms an image of either a single panel having, for example, red, green, and blue pixels, or three individual panels, one for each color. For ease of reference, the following discussion will be in terms of a projection lens system that employs a single LCD panel, it being understood that the invention can also be used in systems which employ multiple panels and/or other types of pixelization.

There exists a need for a projection lens for use with a LCD panel which simultaneously has at least the following properties: (1) a long focal length, e.g., a focal length greater than the largest dimension of the LCD panel for a large LCD panel, e.g., a LCD panel having a largest dimension greater than about 10 centimeters; (2) a relatively long back focal length, e.g., a back focal length greater than the lens' focal length; (3) a high level of color correction; (4) low distortion; (5) the ability to operate at various magnifications while maintaining an efficient coupling to the output of the illumination system and a high level of aberration correction; (6) low sensitivity to temperature changes; and (7) a minimal number of lens elements, a majority of which are made of plastic, so as to minimize the overall cost of the system.

A long focal length is desired since it permits the use of large LCD panels, e.g., panels having a width greater than 10 cm, such as those having a width on the order of 20 cm, while still maintaining the field angle of the projection lens in a manageable range, e.g., in the range of about 50°–60° (full field). Large LCD panels are desirable since they provide either greater resolution if small pixels are used or easier manufacture if larger pixels are used.

A relatively long back focal length, i.e., the distance from the last lens surface to the LCD panel, is desirable since it allows the output of the illumination system to be in the vicinity of the projection lens for output distances which are relatively large. Relatively large output distances are desirable since they provide relatively shallow entrance angles for the light at the LCD panel.

A high level of color correction is important because color aberrations can be easily seen in the image of a pixelized panel as a smudging of a pixel or, in extreme cases, the complete dropping of a pixel from the image. These problems are typically most severe at the edges of the field. In general terms, the color correction, as measured at the LCD panel, should be better than about half a pixel to avoid these problems, e.g., the color correction should be preferably better than about 100 microns for pixels having a characteristic dimension of about 200 microns.

All of the chromatic aberrations of the system need to be addressed, with lateral color, chromatic variation of coma, and chromatic aberration of astigmatism typically being most challenging. Lateral color, i.e., the variation of magnification with color, is particularly troublesome since it manifests itself as a decrease in contrast, especially at the edges of the field. In extreme cases, a rainbow effect in the region of the full field can be seen.

In projection systems employing cathode ray tubes (CRTs) a small amount of (residual) lateral color can be compensated for electronically by, for example, reducing the size of the image produced on the face of the red CRT relative to that produced on the blue CRT. With a pixelized panel, however, such an accommodation cannot be performed because the image is digitized and thus a smooth adjustment in size across the full field of view is not possible. A higher level of lateral color correction is thus needed from the projection lens.

It should be noted that color aberrations become more difficult to correct as the focal length of the projection lens increases. Thus, the first two criteria discussed above, i.e., a long focal length and a high level of color correction, work against one another in arriving at a suitable lens design.

The use of a pixelized panel to display data leads to stringent requirements regarding the correction of distortion. This is so because good image quality is required even at the extreme points of the field of view of the lens when viewing data. As will be evident, an undistorted image of a displayed number or letter is just as important at the edge of the field as it is at the center. Moreover, projection lenses are often used with offset LCD panels so that the distortion at the viewing screen does not vary symmetrically about a horizontal line through the center of the screen but increases monotonically from, for example, the bottom to the top of the screen. This effect makes even a small amount of distortion readily visible to the viewer.

A projection lens which can efficiently operate at various magnifications is desirable since it allows the projection system to be used with screens of different sizes without the need to change any of the components of the system. Only the object and image conjugates need to be changed which can be readily accomplished by moving the lens relative to the LCD panel. The challenge, of course, is to provide efficient coupling to the output of the illumination system and a high level of aberration correction throughout the operative range of magnifications.

In order to produce an image of sufficient brightness, a substantial amount of light must pass through the projection lens. As a result, a significant temperature difference normally exists between room temperature and the lens' operating temperature. In addition, the lens needs to be able to operate under a variety of environmental conditions. For example, projection lens systems are often mounted to the ceiling of room, which may comprise the roof of a building where the ambient temperature can be substantially above 40° C. To address these effects, a projection lens whose optical properties are relatively insensitivity to temperature changes is needed.

One way to address the temperature sensitivity problem is to use lens elements composed of glass. Compared to plastic, the radii of curvature and the index of refraction of a glass element generally change less than those of a plastic element. However, glass elements are generally more expensive than plastic elements, especially if aspherical surfaces are needed for aberration control. Similarly, a lens design composed of a small number of lens elements is desirable since, like the use of plastic, less elements means less overall cost for the lens system.

The projection lenses described below achieve all of the above requirements and can be successfully used in producing low cost projection lens systems capable of forming a high quality color image of a pixelized panel on a viewing screen.

DESCRIPTION OF THE PRIOR ART

Projection lenses for use with pixelized panels are described in various patents including Taylor, U.S. Pat. No. 4,189,211, Tanaka et al., U.S. Pat. No. 5,042,929, Yano et al., U.S. Pat. No. 5,179,473, Moskovich, U.S. Pat. No. 5,200,861, Moskovich, U.S. Pat. No. 5,218,480, Iizuka et al., U.S. Pat. No. 5,278,698, Betensky, U.S. Pat. No. 5,313,330, and Yano, U.S. Pat. No. 5,331,462. Discussions of LCD systems can be found in Gagnon et al., U.S. Pat. No. 4,425,028, Gagnon, U.S. Pat. No. 4,461,542, Ledebuhr, U.S. Pat. No. 4,826,311, and EPO Patent Publication No. 311,116.

SUMMARY OF THE INVENTION

In view of the foregoing, it is an object of the present invention to provide improved projection lenses for use with a LCD panel which simultaneously have each of the seven desired properties discussed above. This object is achieved by means of a projection lens which comprises in order from its image side to its object side (i.e., from its long conjugate side to its short conjugate side):

(a) a first lens element having a negative power and composed of a plastic material having a low dispersion, e.g., acrylic;

(b) a second lens element having a positive power and composed of a plastic material having a low dispersion, e.g., acrylic;

(c) a third lens element having a negative power and composed of a plastic material having a high dispersion, e.g., styrene; and (d) a fourth lens element composed of a material having a low dispersion, e.g., acrylic or preferably crown glass.

In certain preferred embodiments of the invention, each of the first, second, and third lens elements has at least one aspherical surface and, most preferably, each has two aspherical surfaces. In other preferred embodiments, the fourth lens element has spherical surfaces and is composed of glass. In still further preferred embodiments, the fourth lens element has a positive power, with the combined power of the third and fourth elements being negative.

In the most preferred embodiments of the invention, the projection lens consists of just the four lens elements described above.

The projection lenses of the invention are preferably designed using the location of the output of the illumination system as a pseudo-aperture stop/entrance pupil of the projection lens (see Betensky, U.S. Pat. No. 5,313,330, the relevant portions of which are incorporated herein by reference). In this way, efficient coupling is achieved between the light output of the illumination system and the projection lens.

In accordance with these aspects, the invention provides a projection lens system which forms an image of an object and comprises:

(a) an illumination system comprising a light source and illumination optics which forms an image of the light source, said image being the output of the illumination system;

(b) a pixelized panel, e.g., a LCD panel, which comprises the object; and (c) a projection lens of the type described above, said projection lens having an entrance pupil whose location substantially corresponds to the location of the output of the illumination system.

In certain preferred embodiments, the magnification of the projection lens system is varied by changing the distance between the last lens surface of the projection lens and the pixelized panel while holding the lens' entrance pupil substantially fixed at the location of the output of the illumination system.

The projection lenses of the invention are also designed to be substantially athermal. As discussed fully below, this is done by employing plastic lens elements having substantial positive and negative powers throughout the projection lens. In this way, changes in the power of the positive lens elements caused by temperature changes are compensated for by changes in the power of the negative lens elements, thus providing substantially constant overall optical properties for the projection lens as its temperature changes.

BRIEF DESCRIPTION OF THE DRAWINGS

FIGS. 1E-1 to 1E-2 show the color correction and distortion properties of the projection lens of FIG. 1A at a finer scale for a image-to-object magnification of −0.130.

FIG. 4 is a schematic diagram showing an overall projection lens system in which the projection lens of the present invention can be used.

The parameters for FIGS. 1B-1 to 1E-2, 2B-1 to 2D-4, and 3B-1 to 3D-4 appear in Table 5. All of the B-1, C-1, and D-1 figures and FIG. 1E-1 show radial distortion, and the B-2, C-2, and D-2 figures show distortion at the viewing screen for a square matrix. All of the B-3, C-3, and D-3 figures and FIG. 1E-2 show lateral aberrations versus relative entrance pupil coordinates, where solid lines represent TAN data, dashed lines represent SAG data, and dotted lines represent SAG-Y data. The wavelengths represented by circles, triangles, and squares in these figures are set forth in Table 6. All of the B-4, C-4, and D-4 figures show monochromatic optical transfer functions, with the left panel showing through focus data and the right panel showing at focus versus frequency data for a wavelength of 0.546, where dotted lines represent PHASE data, dashed lines represent SAG data, and solid lines represent TAN data. The at focus positions are set forth in Table 7.

Figure 1A:
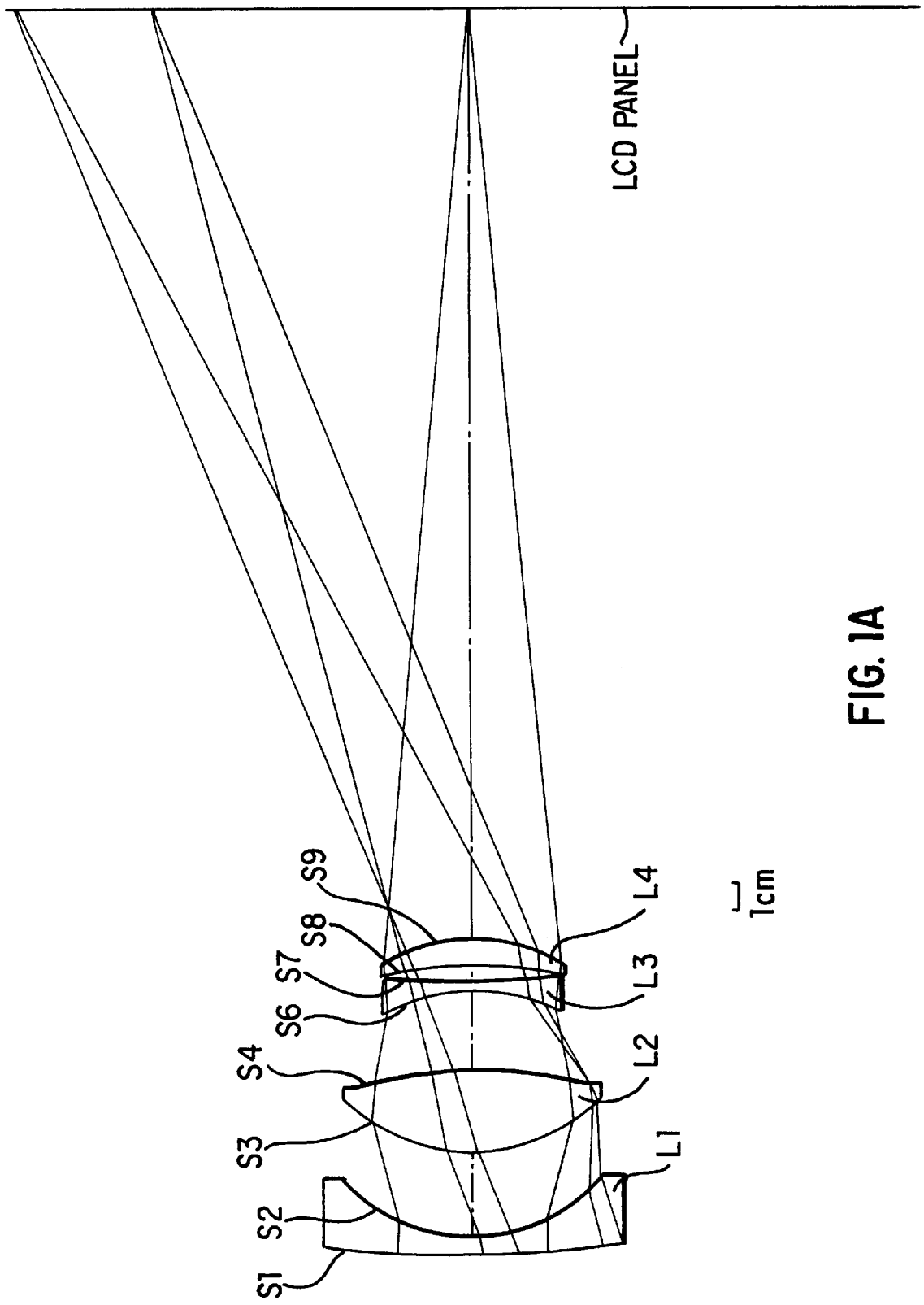
FIGS. 1A, 2A, and 3A are schematic side views of projection lenses constructed in accordance with the invention.

These drawings, which are incorporated in and constitute part of the specification, illustrate the preferred embodiments of the invention, and together with the description, serve to explain the principles of the invention. It is to be understood, of course, that both the drawings and the description are explanatory only and are not restrictive of the invention.

DESCRIPTION OF THE PREFERRED EMBODIMENTS

As discussed above, the projection lenses of the present invention include lens elements having high and low dispersion, the order of the elements from the image side being low dispersion/low dispersion/high dispersion/low dispersion.

In general terms, a high dispersion material is a material having a dispersion like flint glass and a low dispersion material is a material having a dispersion like crown glass. More particularly, high dispersion materials are those having V-values ranging from 20 to 50 for an index of refraction in the range from 1.85 to 1.5, respectively, and low dispersion materials are those having V-values ranging from 35 to 75 for the same range of indices of refraction.

For the plastic lens elements, the low and high dispersion materials of choice are acrylic and styrene, respectively. Other plastics can, of course, be used if desired. For example, in place of styrene, polycarbonates and copolymers of polystyrene and acrylic (e.g., NAS) having flint-like dispersions can be used. See *The Handbook of Plastic Optics*, U.S. Precision Lens, Inc., Cincinnati, Ohio, 1983, pages 17–29.

An important aspect of the projection lenses of the invention is that they are athermalized, i.e., the optical performance of the system, including, in particular, the distance between the last lens surface of the lens and the LCD panel (the "back focal length"), does not substantially change as the projection lens is heated from room temperature to its operating temperature. In particular, the change in the back focal length is preferably less than an amount which will significantly change the modulation transfer function (MTF) of the system, e.g., the change in the MTF should be less than about 5%. For the specific examples presented below, this MTF criterion corresponds to a change in the back focal length of less than about 0.2 millimeters. The desired thermal stabilization of the lens' focus is achieved through the selection and placement in the lens of the plastic lens elements.

Ordinarily, the use of plastic lens elements has the drawback that the refractive index of plastic optical materials changes significantly with temperature. Another effect is the change in shape, i.e., expansion or contraction, of plastic optical materials with temperature. This latter effect is usually less significant than the change in index of refraction.

If only low power plastic lens elements are used in a lens it is possible to achieve a balance between the thermal changes in the plastic optics and the thermal changes in the plastic or aluminum mechanical components of the system, e.g., the lens barrel which is usually the major mechanical source of thermally-caused focus changes. The unrestricted use of optical plastics in a design, i.e., the ability to use plastic lens elements of relatively high power, has advantages in that, since the plastic lens elements can be readily molded, non-spherical optical surfaces (aspherics) can be used to maximize the capability (performance) of a particular lens design. The use of relatively high power plastic elements also leads to a lens having an overall lower cost.

If the net plastic optical power in a design is significant, then athermalization needs to be performed or the focus of the lens will change significantly as the lens' temperature changes from room temperature to its operating temperature. This is especially so with projectors which must transmit significant amounts of light to a viewing screen and thus have an operating temperature significantly above room temperature.

For the projection lenses of the present invention, athermalization is achieved by balancing positive and negative plastic optical power, while also taking into account both the location of the plastic lens elements and the marginal ray heights at those elements.

The location of the plastic lens elements is significant in terms of the amount of temperature change the element will undergo and thus the amount of change which will occur in the element's index of refraction. In general, elements close to the light source or the image of the light source will undergo greater temperature changes. In practice, a temperature distribution in the region where the projection lens is to be located is measured with the light source and its associated illumination optics operating and those measured values are used in the design of the projection lens.

The marginal ray height at a particular plastic lens element determines, for a given thermal change, whether changes in the element's index of refraction will be significant with regard to the overall thermal stability of the lens. Elements for which the marginal ray height is small, e.g., elements near the focus of the system, will in general have less effect on the overall thermal stability of the system than elements for which the marginal ray height is large.

Based on the foregoing considerations, athermalization is achieved by balancing the amount of negative and positive power in the plastic lens elements with the contributions of particular elements being adjusted based on the temperature change which the element is expected to undergo and the marginal ray height at the element. In practice, this athermalization procedure is incorporated into a computerized lens design program as follows. First, a ray trace is performed at a first temperature distribution and a back focal distance is calculated. The ray trace can be a paraxial ray trace for the marginal ray. Second, the same ray trace is performed at a second temperature distribution and the back focal distance is again calculated. Neither the first nor the second temperature distribution need be constant over the entire lens but can, and in the typical case does, vary from lens element to lens element. The calculated back focal distances are then constrained to a constant value as the design of the system is optimized using the lens design program.

It should be noted that the foregoing approach assumes that the mechanical mounts for the projection lens and the LCD panel hold the distance between the last lens surface and the LCD panel substantially constant as the temperature of the system changes. If such an assumption is not warranted, other provisions can be made for performing the athermalization, e.g., a measured value for the relative movement of the mechanical mounts can be included in the process or an alternate distance, e.g., the distance between the front lens surface and the LCD panel, can be assumed to be mechanically fixed.

Figure 2A:
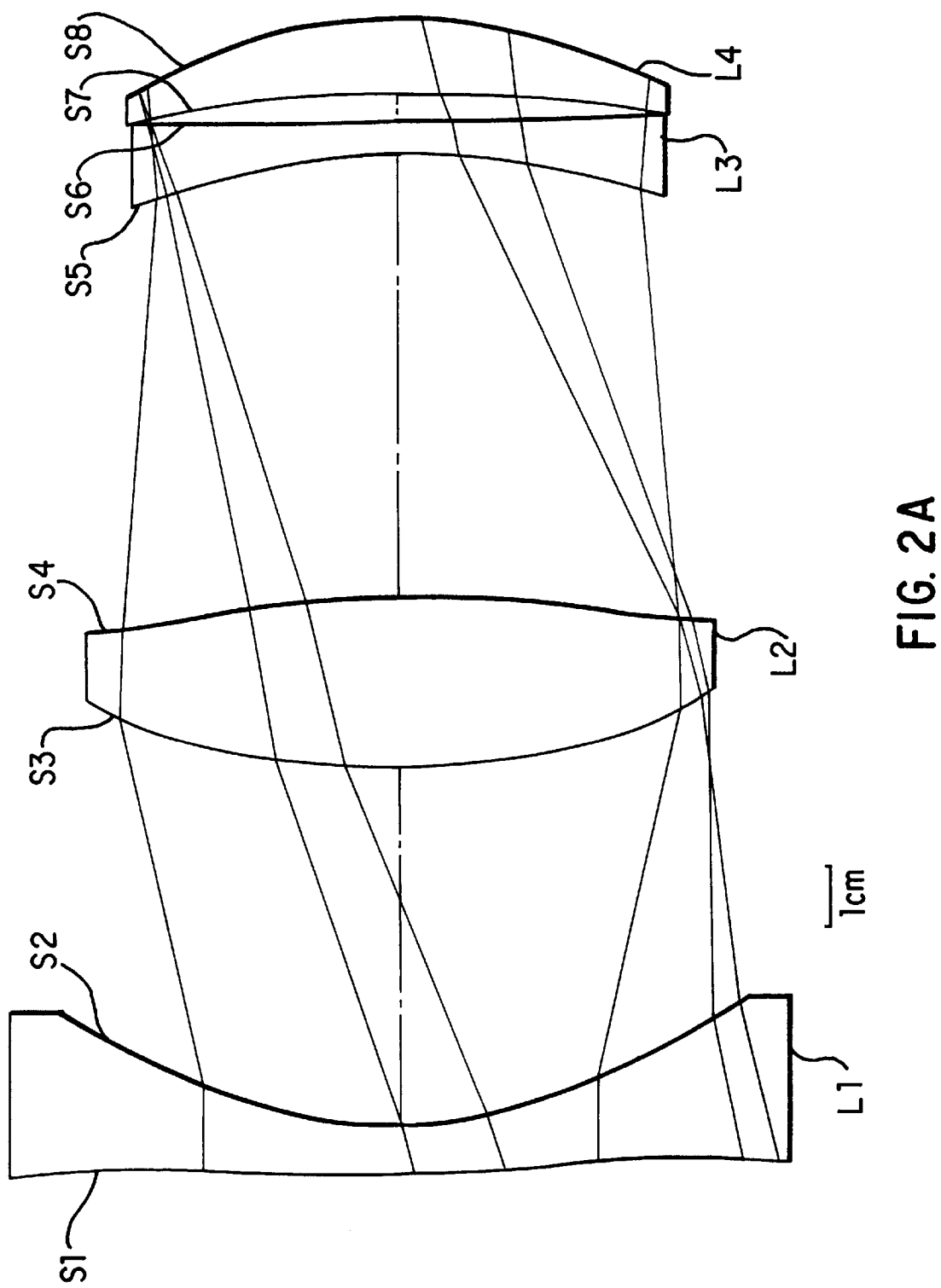
Figures 1, 2B:
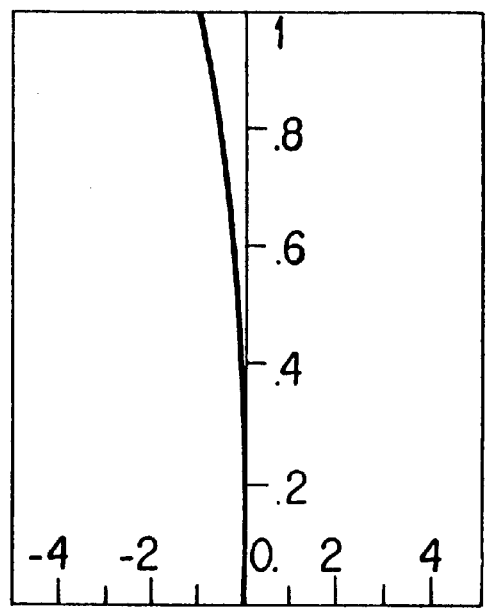
Figures 2, 2B:
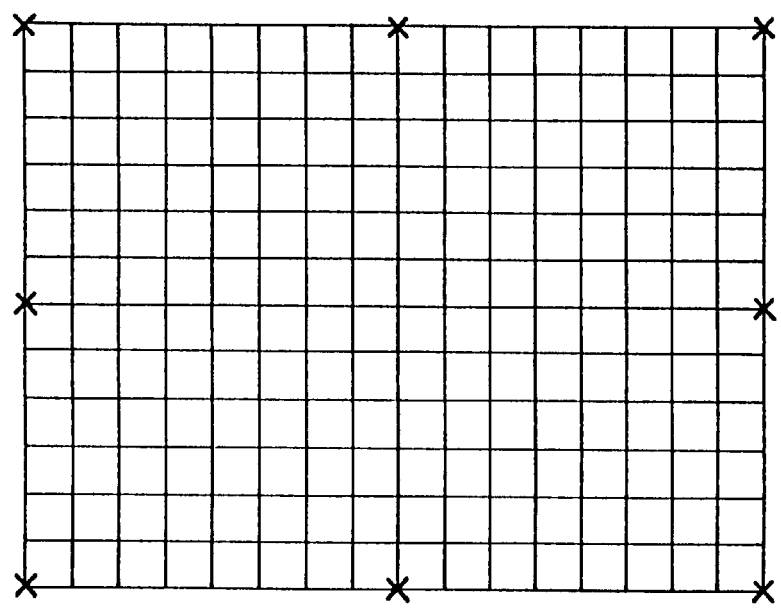
Figures 2, 2B, 3:
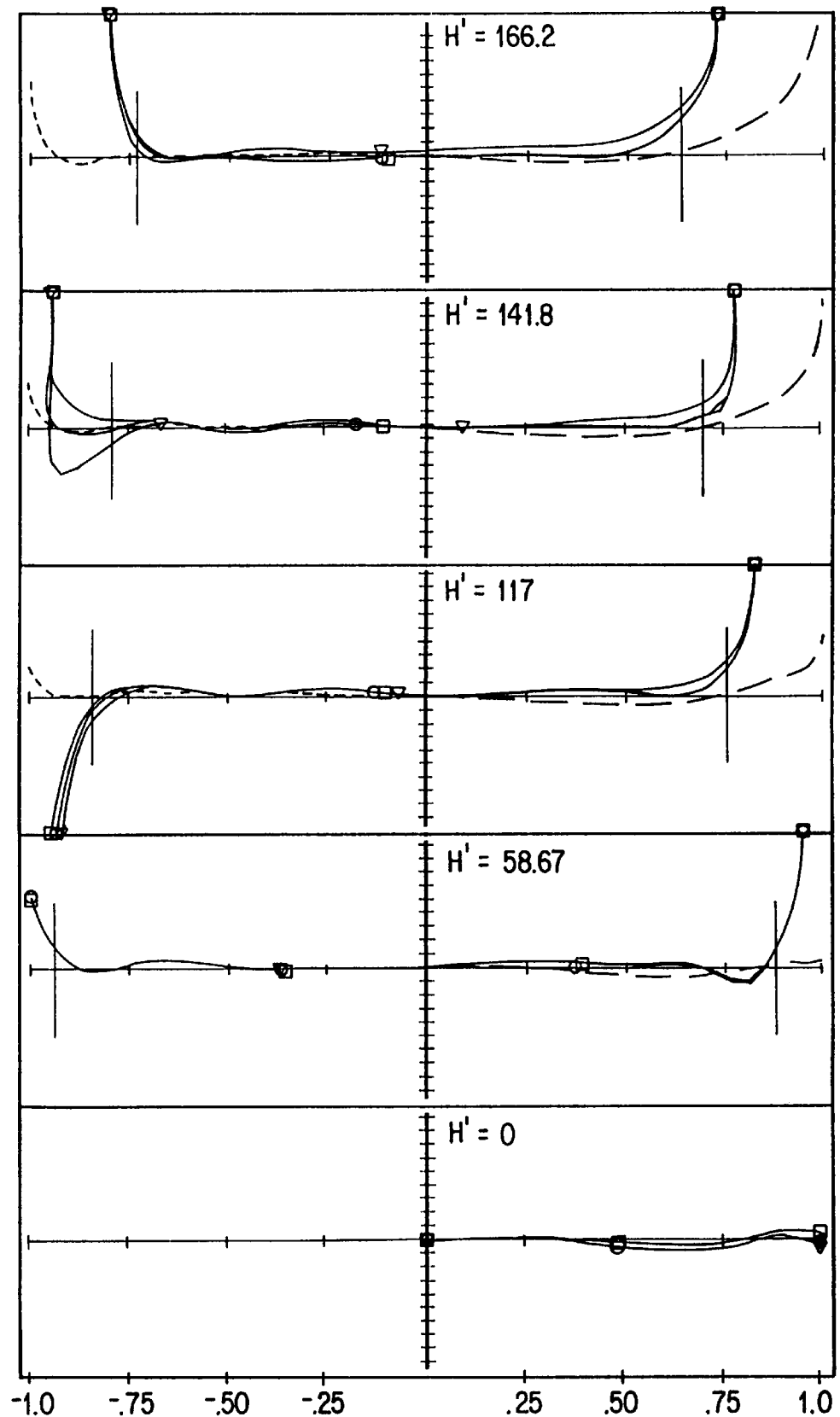
Figures 2, 2B, 3, 4:
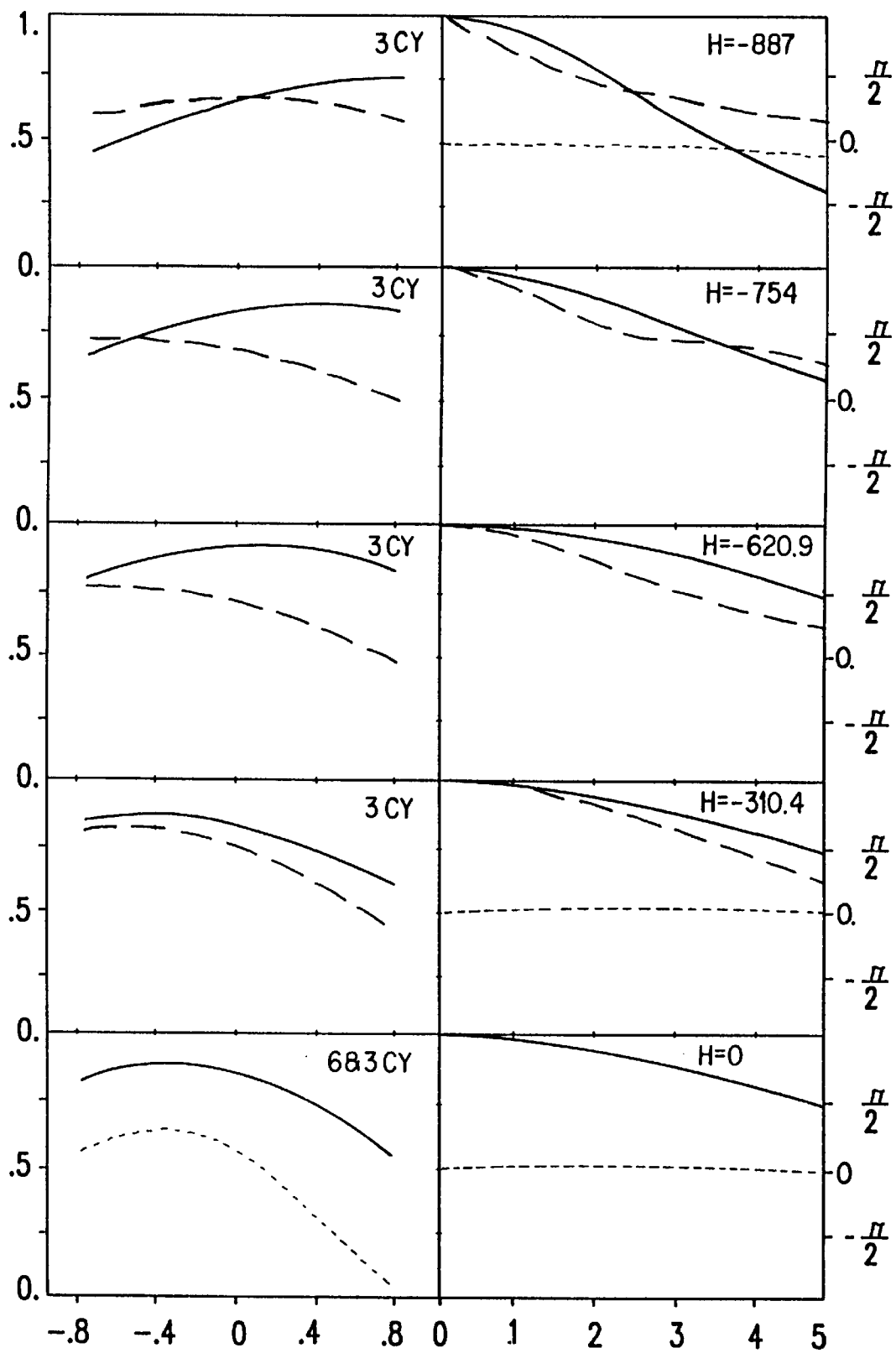
Figures 1, 2C:
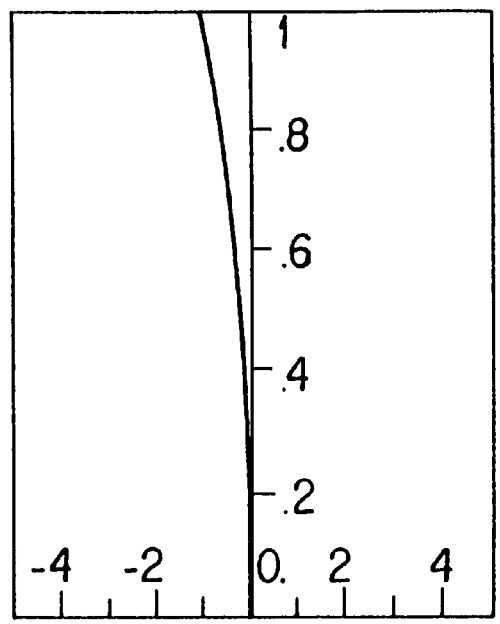
Figures 2, 2C:
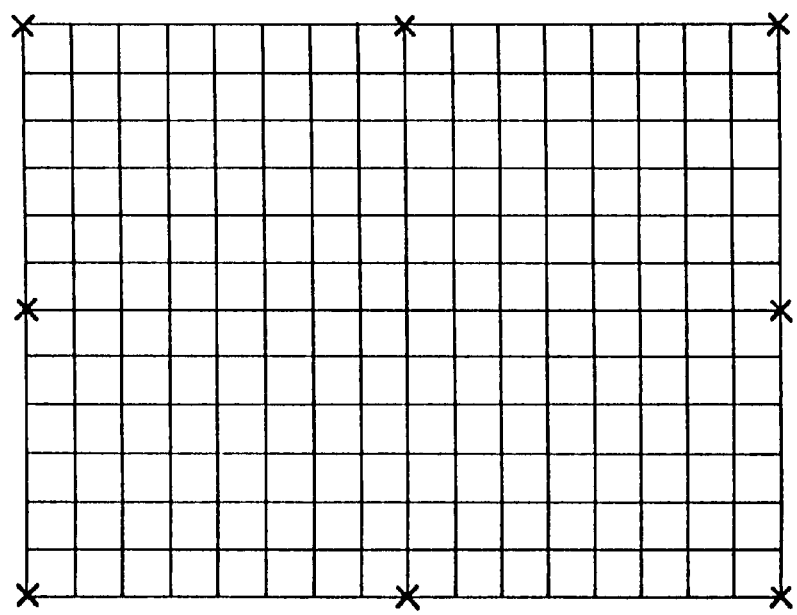
Figures 2, 2C, 3:
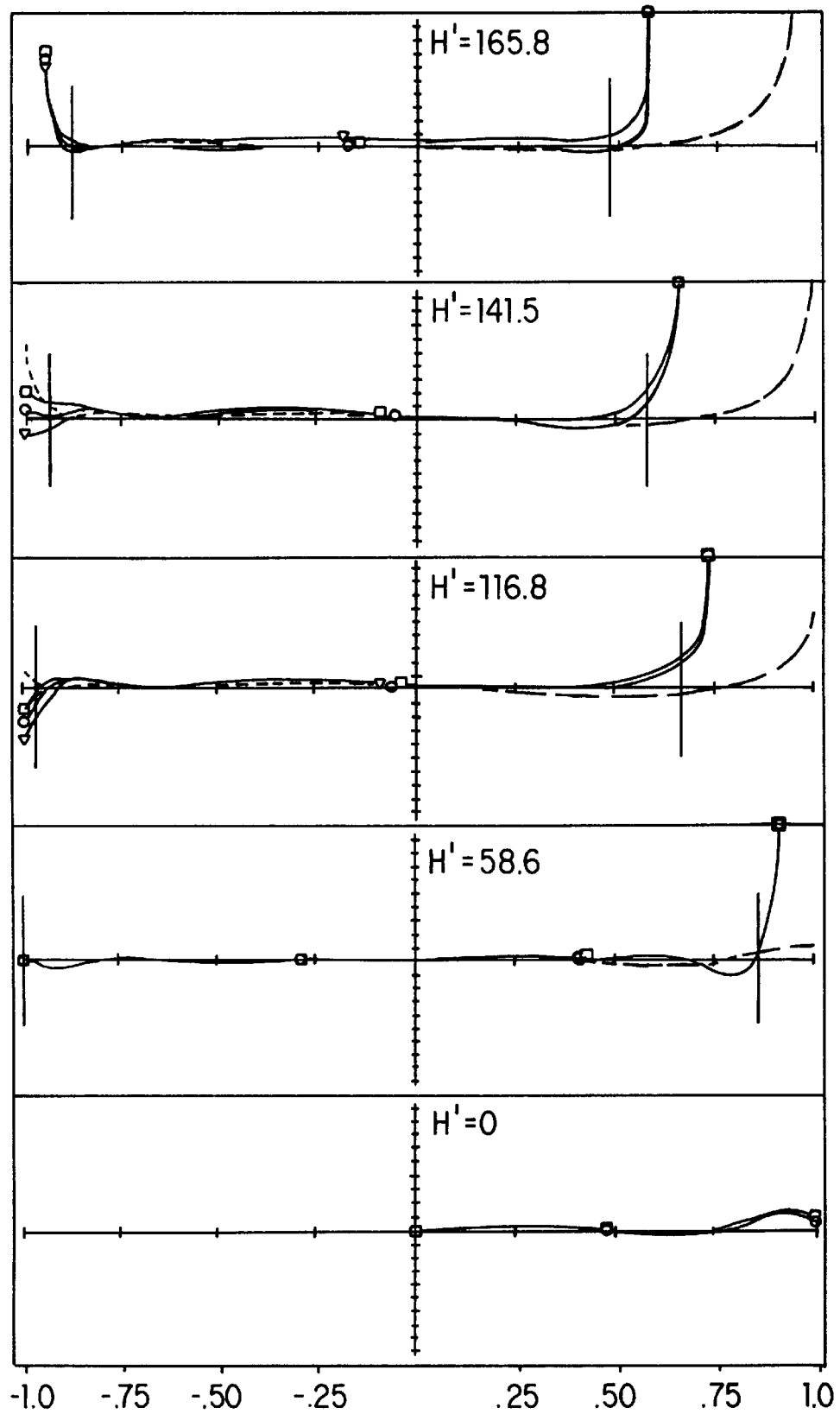
Figures 2, 2C, 3, 4:
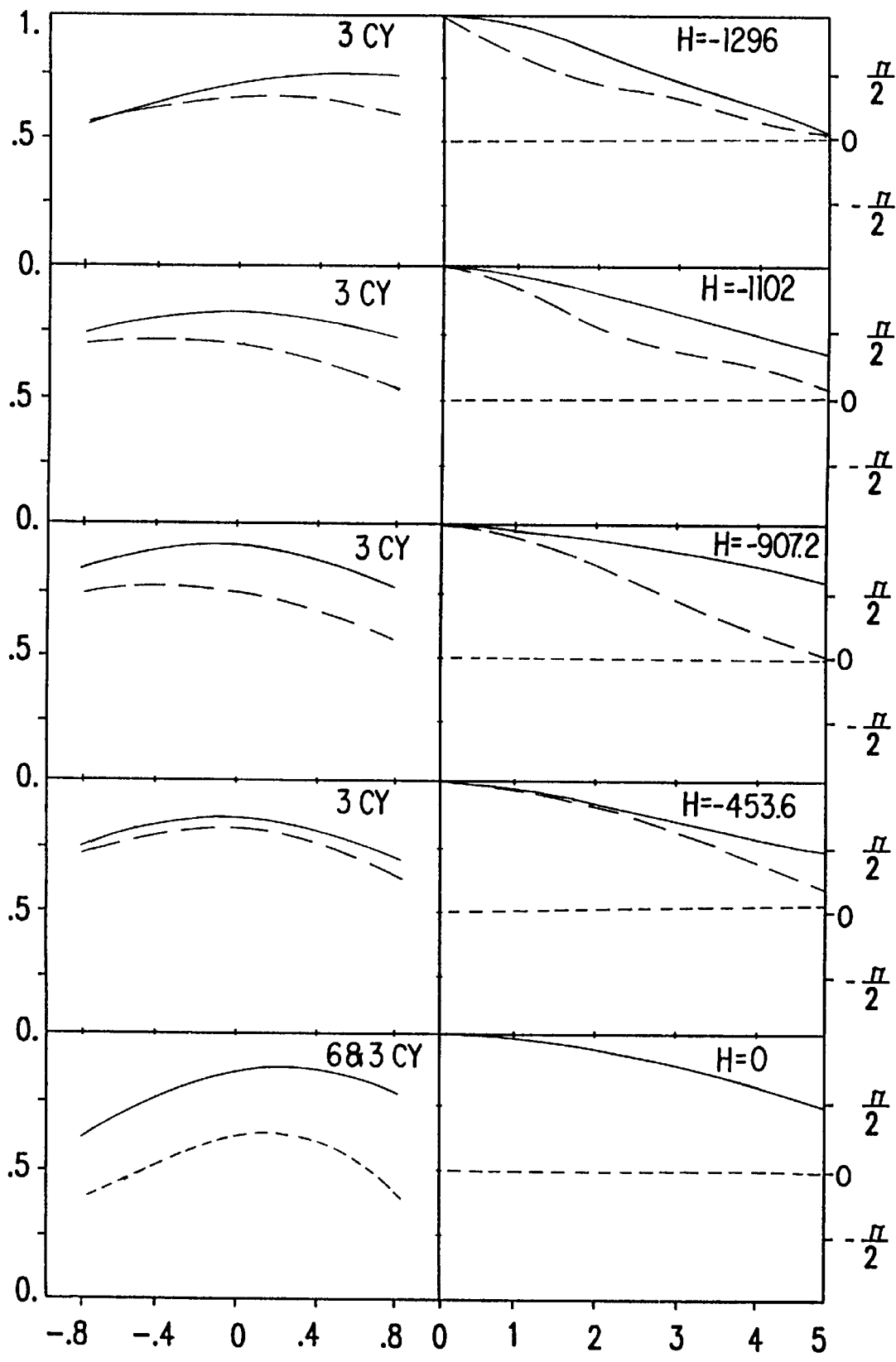
Figures 1, 2D:
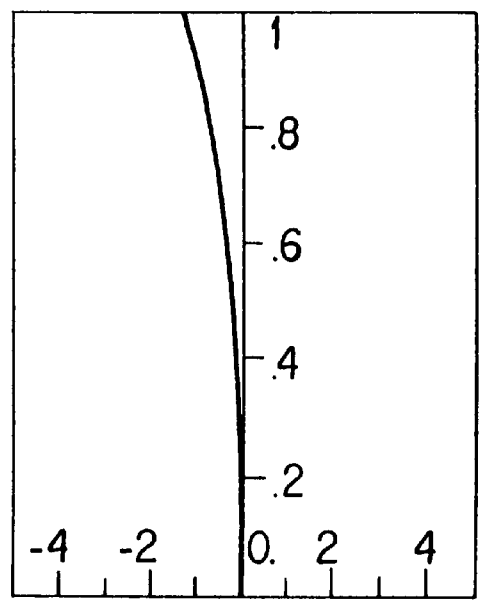
Figures 2, 2D:
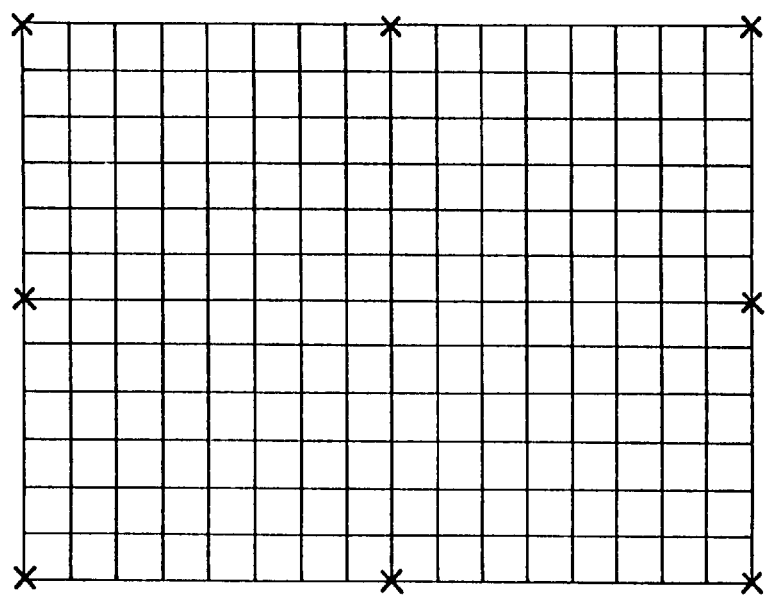
Figures 2, 2D, 3:
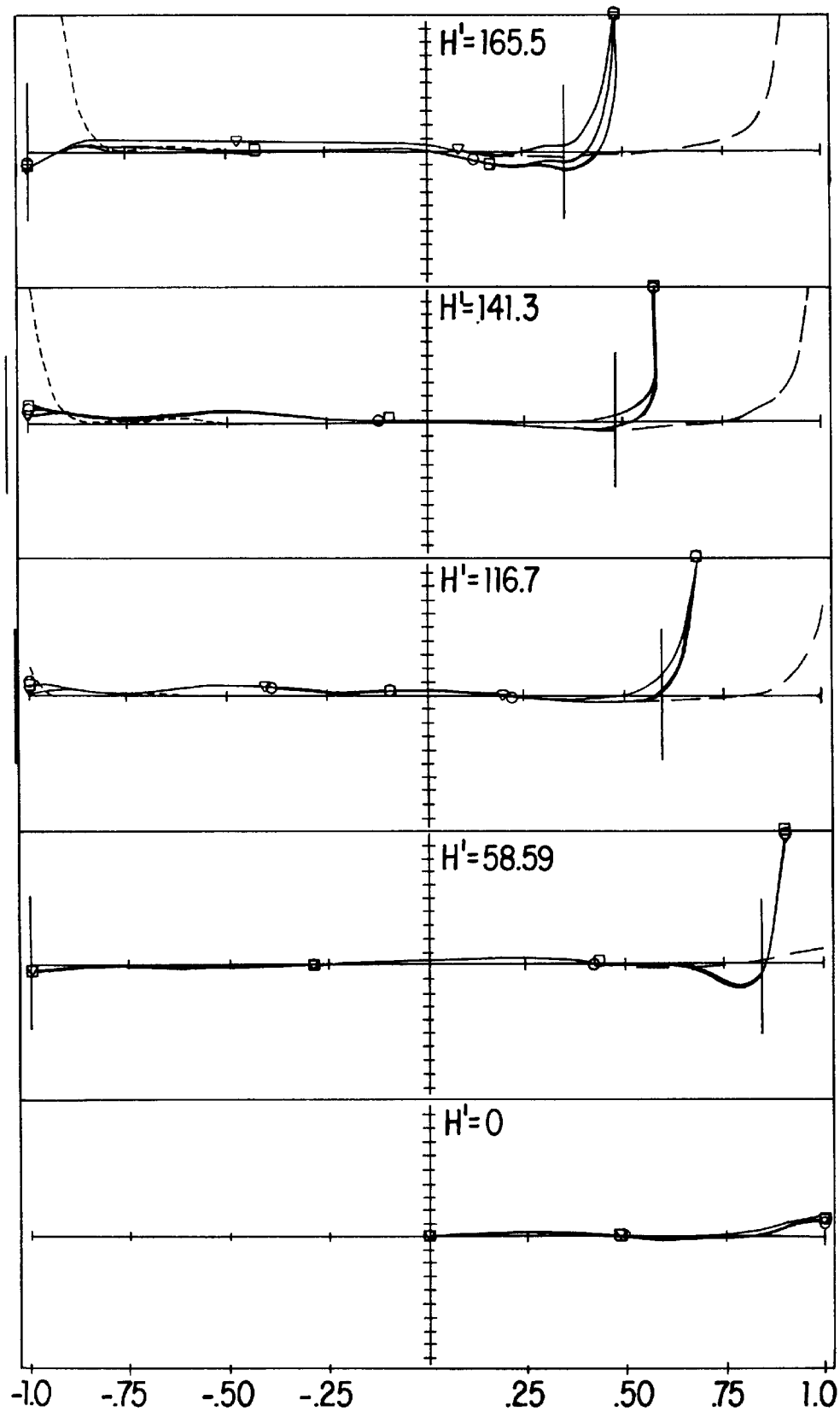
Figures 2, 2D, 3, 4:
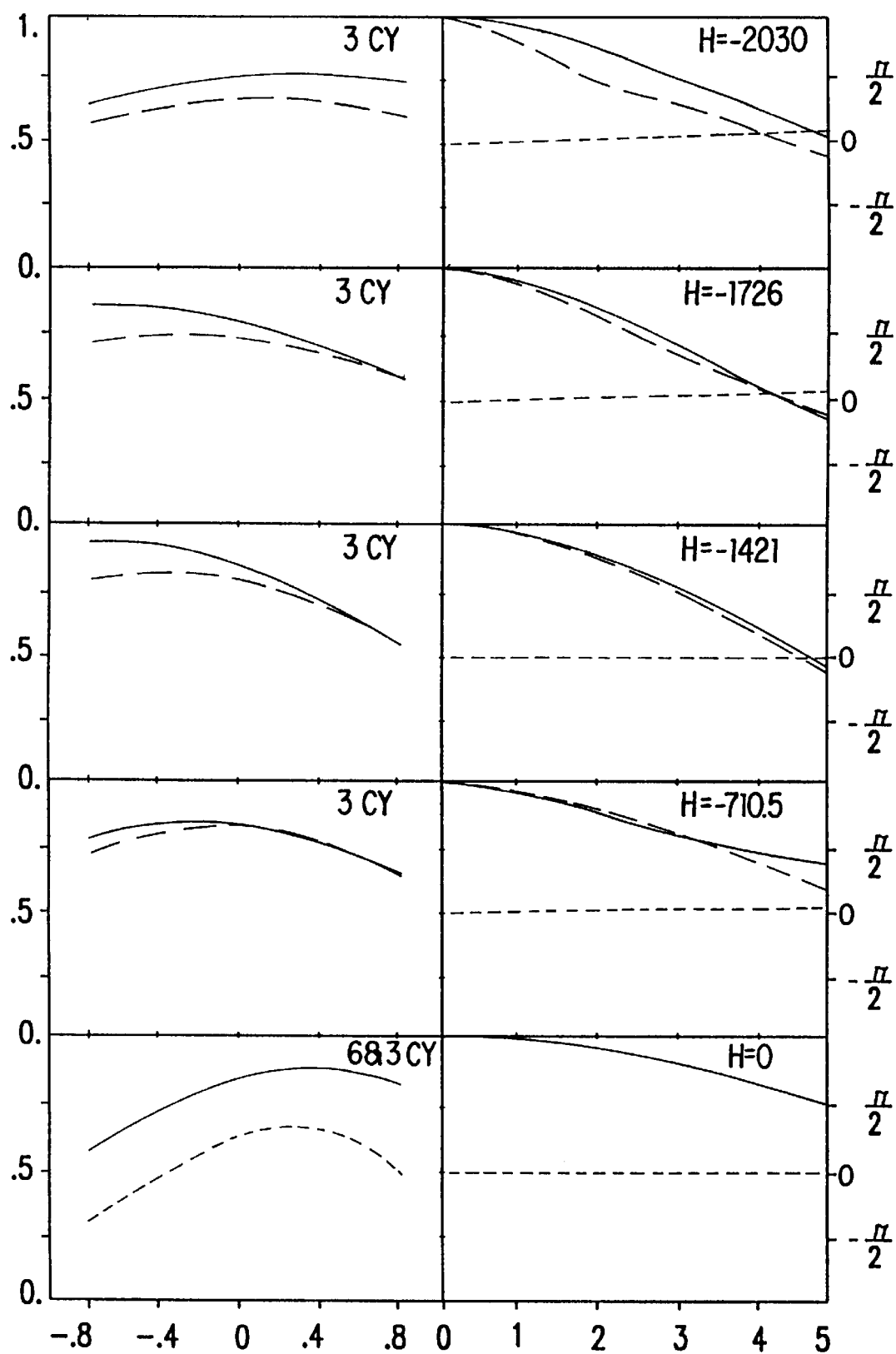
Figure 3A:
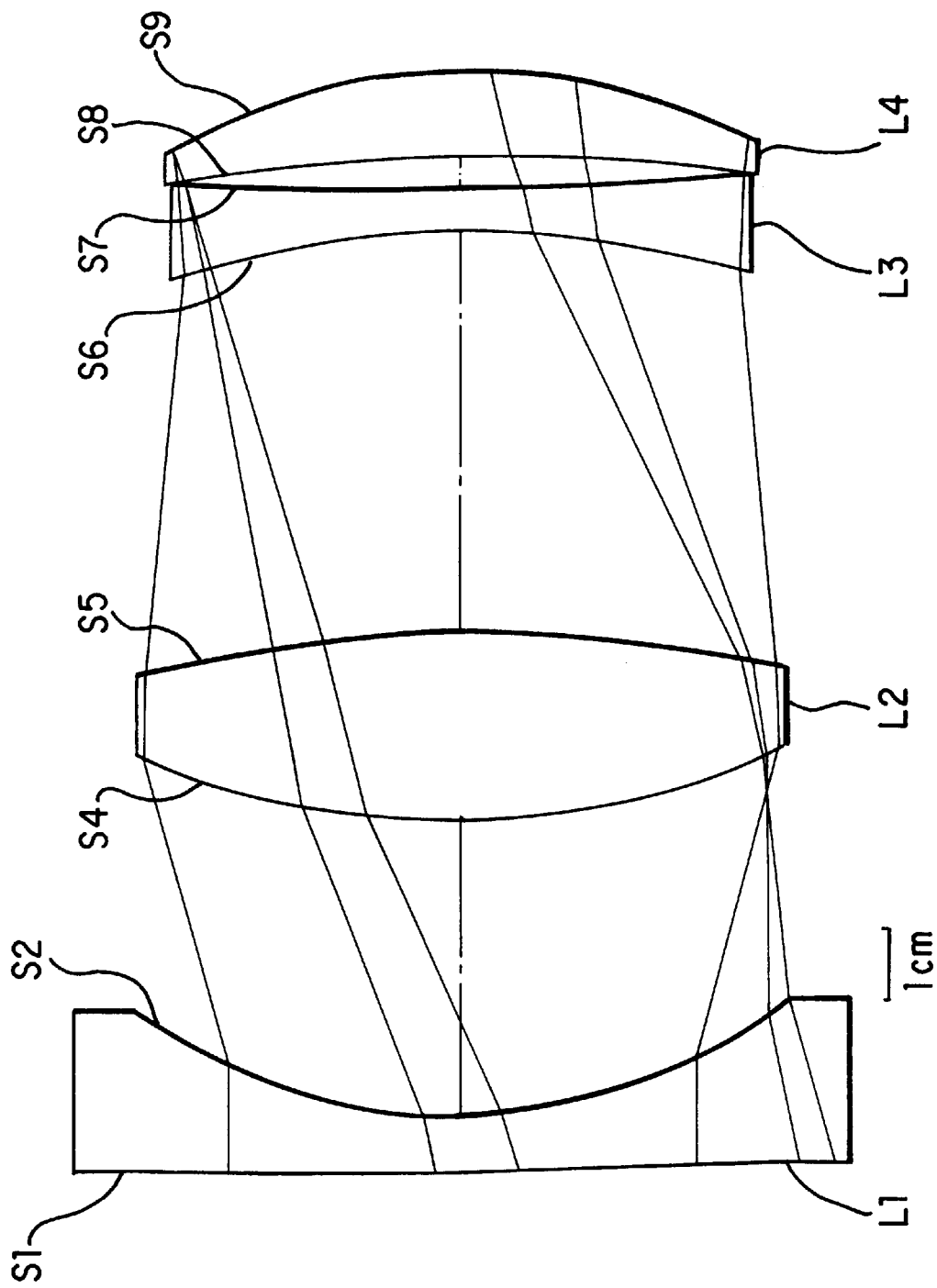

FIGS. 1A, 2A, and 3A illustrate various projection lenses constructed in accordance with the invention. Corresponding lens prescriptions appear in Tables 1 to 3, respectively. Lens elements and lens surfaces are identified by "L" and "S" numbers, respectively, in the figures.

As is conventional, the figures are drawn with the long conjugate on the left and the short conjugate on the right. Accordingly, in the typical application of the invention, the viewing screen will be on the left and the LCD panel will be on the right. A LCD panel is shown in FIG. 1A and would have a similar relative location for the lenses of FIGS. 2A and 3A.

The glasses and plastics referred to in Tables 1–3 are set forth in Table 4, where the glass names are the HOYA designations. Equivalent materials made by other manufacturers can be used in the practice of the invention.

The aspheric coefficients set forth in the tables are for use in the following equation:

$$z = \frac{cy^2}{1 + [1 - (1+k)c^2 y^2]^{1/2}} + Dy^4 + Ey^6 + Fy^8 + Gy^{10} + Hy^{12} + Iy^{14}$$

where z is the surface sag at a distance y from the optical axis of the system, c is the curvature of the lens at the optical axis, and k is a conic constant, the value of which is zero except where indicated in the tables.

The abbreviations used in Tables 1–3 are as follows: OBJ.HT—object height; f/—f-number; MAG—magnification; STOP—aperture stop; EFL—effective focal length; FVD—front vertex distance; ENP—entrance pupil; IMD—image distance; BRL—barrel length; EXP—exit pupil; OBD—object distance; and OVL—overall length, where the values given are for light traveling from left to right in the figures.

The designation "a" associated with various surfaces represents "aspheric" and the designation "ac" represents an aspherical surface with a conic constant whose value is not zero. Surface 5 in Table 1 and surface 3 in Table 3 correspond to the location of vignetting apertures (not shown in the figures). All dimensions given in Tables 1–3 are in millimeters.

As discussed above, the projection lenses of this invention were designed using the pseudo-aperture stop/entrance pupil technique of Betensky, U.S. Pat. No. 5,313,330. Surface 9 in Table 2 and surface 10 in Tables 1 and 3 constitutes the pseudo-aperture stop. Its location corresponds to the location of the output of the illumination system.

As can be seen in the subtables labeled "Variable Spaces," the distance from the pseudo-aperture stop to the LCD panel, i.e., the "Image Distance," is essentially constant for all focal positions (magnifications) of the projection lens system. In contrast, space 8 in Table 2 and space 9 in Tables 1 and 3 changes for the different magnifications. In some cases, this space is negative corresponding to the illumination output being located within the space defined by the lens' front and back lens surfaces.

With regard to athermalization, it should be noted that for each of the prescriptions set forth in Tables 1–3, the magnitude of the power of the second lens element is greater than the magnitude of the power of each of the first, third, and fourth lens elements. This relatively strong power for a positive plastic lens element achieves the desired balance relative to the negative plastic lens elements during changes in the temperature of the system.

As discussed above, the fourth lens element of the projection lens is preferably composed of glass. This is especially so when the output of the illumination system passes through the fourth element as the magnification of the system is changed. Significant heat is generated in the vicinity of this output, and a glass lens element is better able to withstand such heat.

Performance characteristics of the projection lenses of Tables 1–3 are shown in FIGS. 1B-D, 2B-D, and 3B-D, respectively. Each of these figures contains the following:

(1) A plot entitled "Radial Distortion" which shows percent distortion versus relative field height.

(2) A calculated image at the viewing screen of a square matrix which qualitatively illustrates the low level of distortion exhibited by the projection lenses of the invention.

(3) A series of plots entitled "Lateral Aberrations vs Relative Entrance Pupil Coordinates" which illustrates the high level of color correction, specifically, lateral color correction, achieved by the projection lenses of the invention for various field points at the LCD panel. The field point heights are in millimeters, and the vertical scales are in tenths of a millimeter.

(4) Optical transfer function (OTF) plots which show the through-focus modulation transfer function (MTF) on the left and the OTF at best axial focus on the right for various field points at the viewing screen. The field heights shown in the right hand plots apply to both the right hand and left hand plots and are in millimeters. The through-focus data are at the indicated spatial frequency in cycles per millimeter. Both the through-focus and best-focus data indicate tangential and sagittal (dashed curves) MTF. The modulus scale is on the left of each block and runs from zero to one. The phase of the OTF is shown as a dotted curve in the best-focus plots. The scale for the phase is indicated on the right of each best-focus block and is in radian measure. All the OTF data are for a wavelength of 546.1 nanometers. The best-focus plane is at the peak of the axial through-focus plot.

Figures 1, 1B:
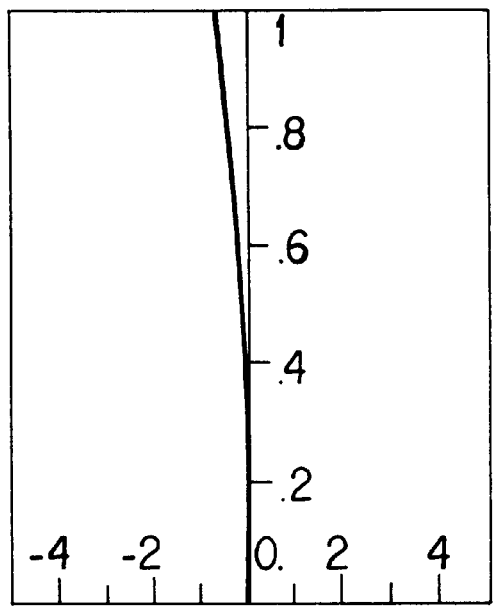
FIGS. 1B-1 to 1D-4, 2B-1 to 2D-4, and 3B-1 to 3D-4 show calculated performance properties at image-to-object magnifications of −0.190, −0.130, and −0.083, corresponding to object-to-image magnifications of −5.3x, −7.7x, and −12x, for the projection lenses of FIGS. 1A, 2A, and 3A, respectively.
Figures 1, 1B, 2:
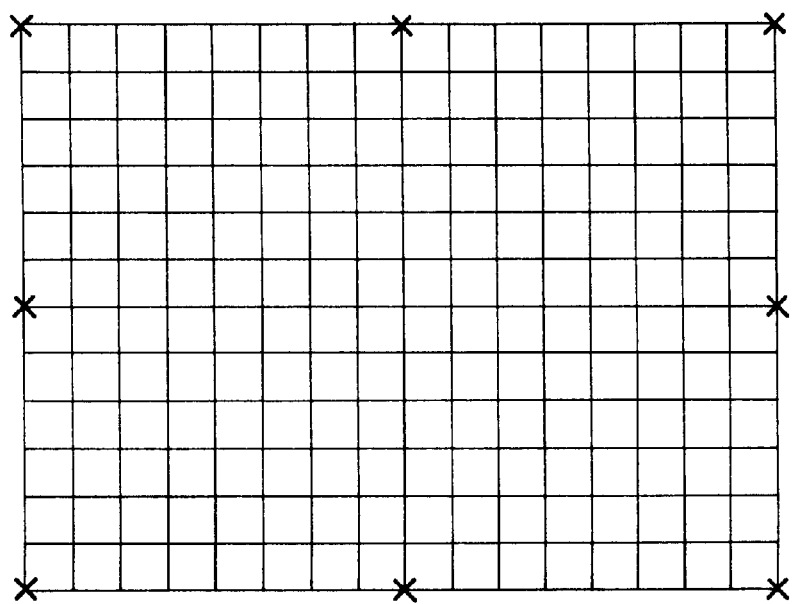
Figures 1, 1B, 2, 3:
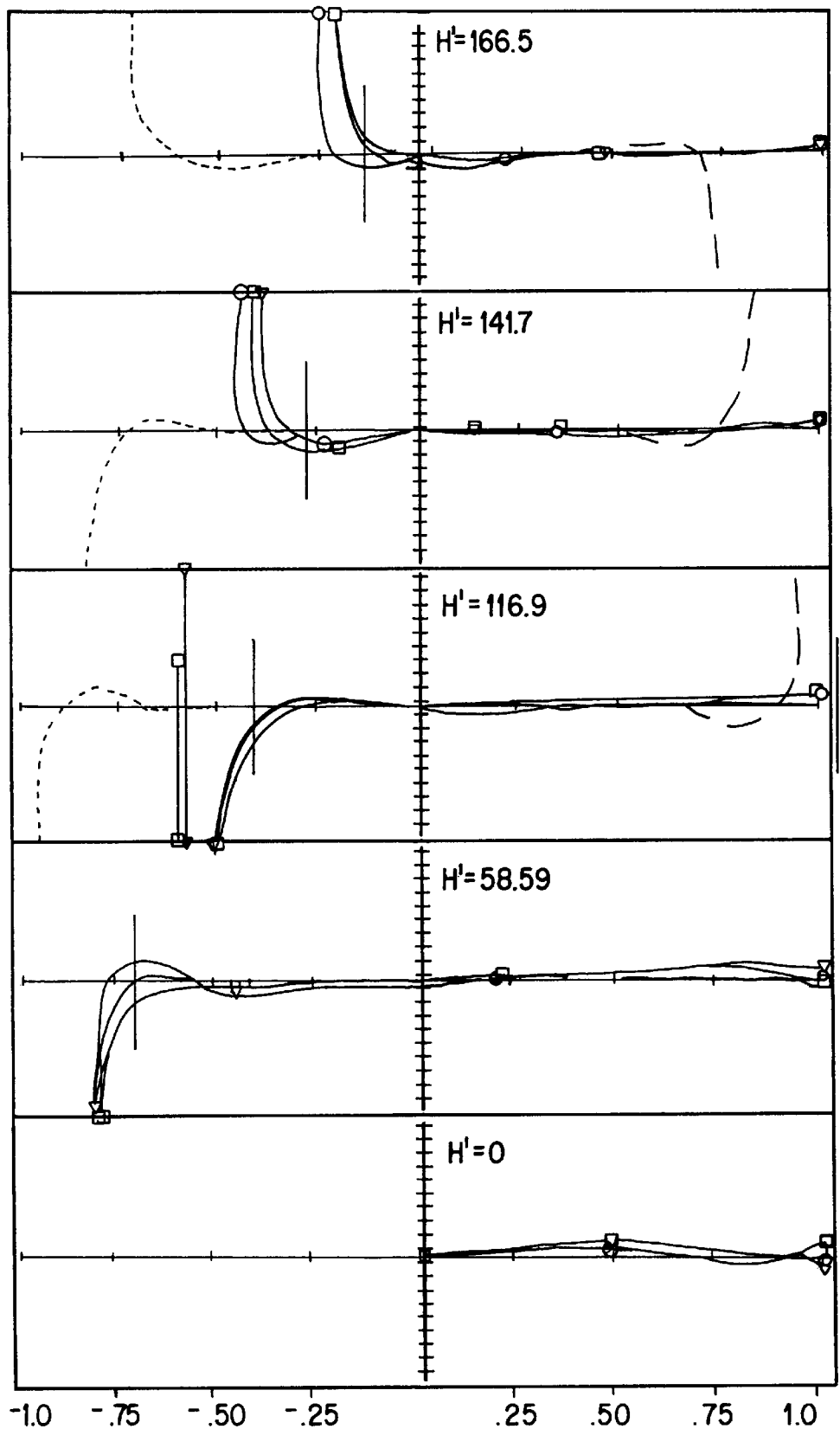
Figures 1, 1B, 2, 3, 4:
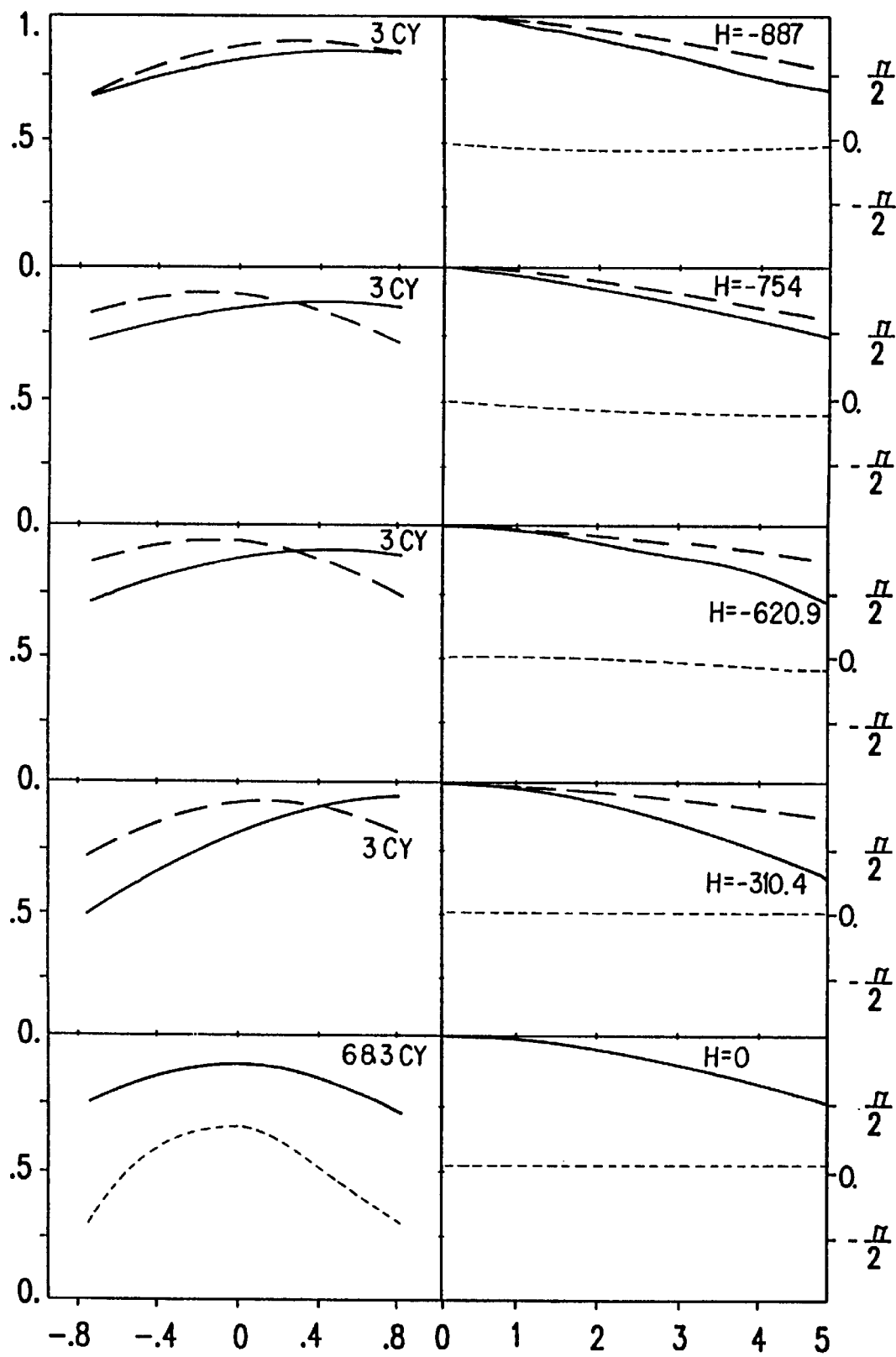
Figures 1, 1C:
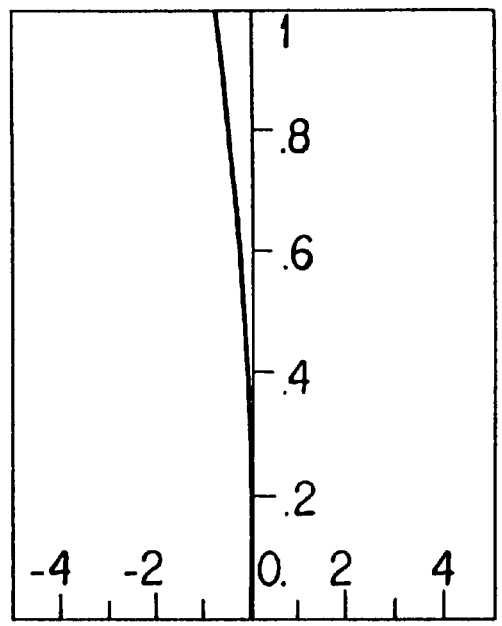
Figures 1, 1C, 2:
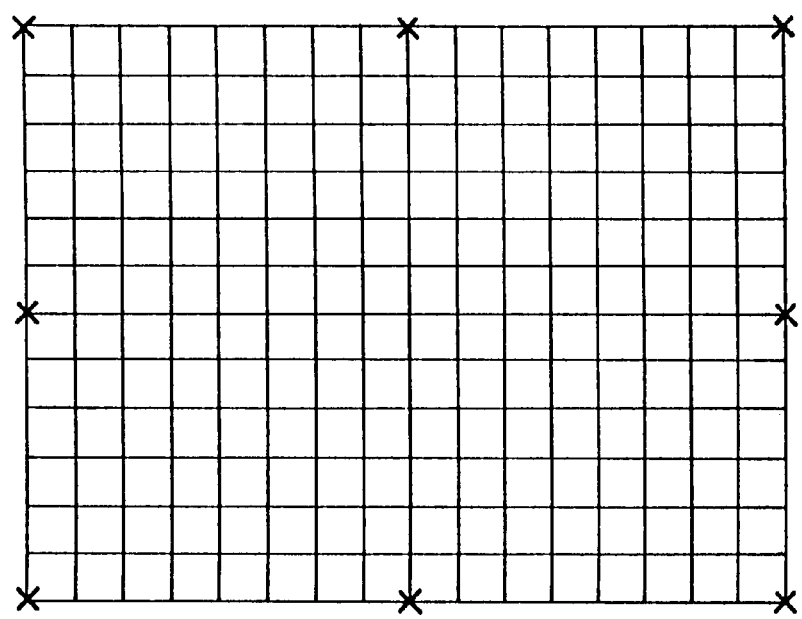
Figures 1, 1C, 2, 3:
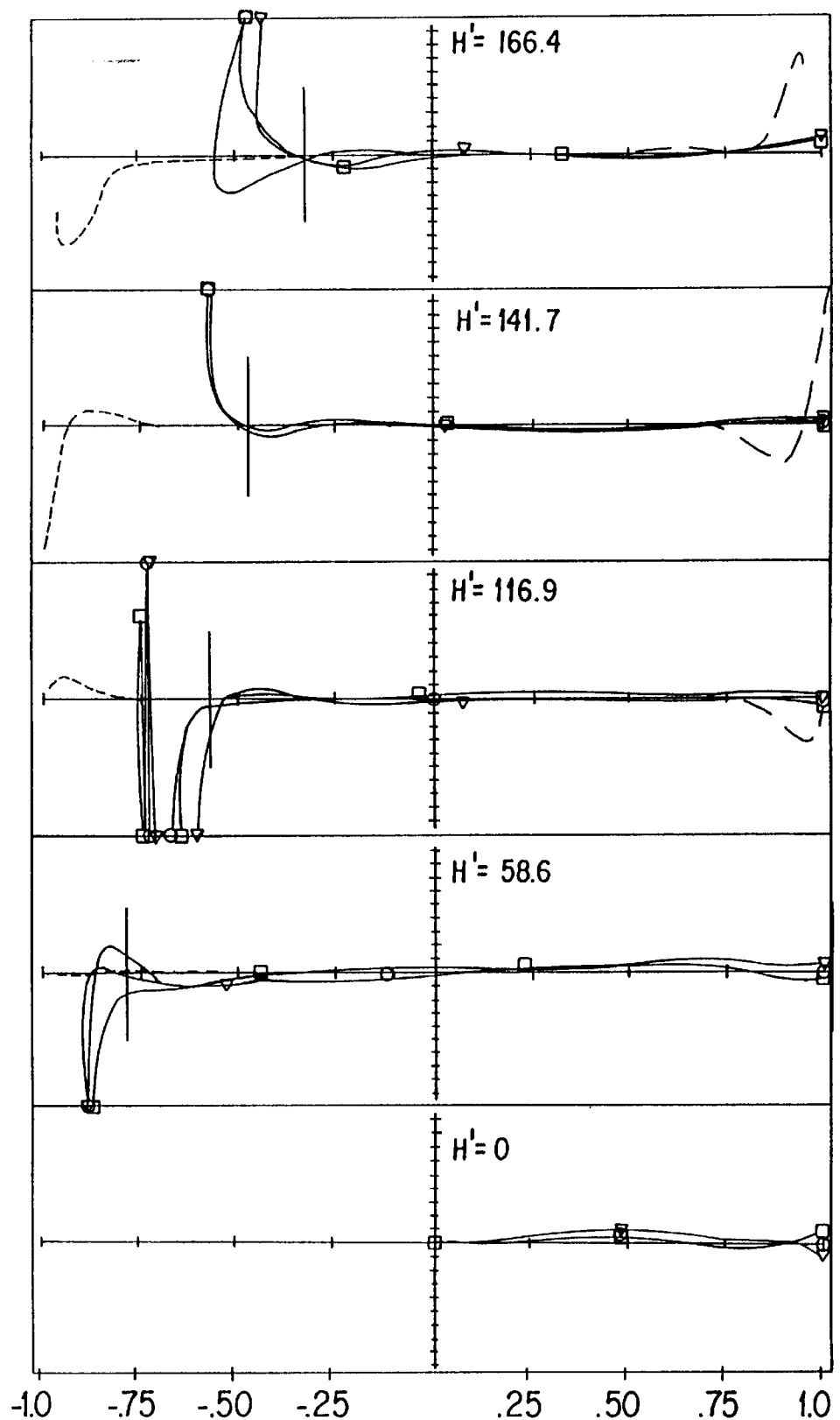
Figures 1, 1C, 2, 3, 4:
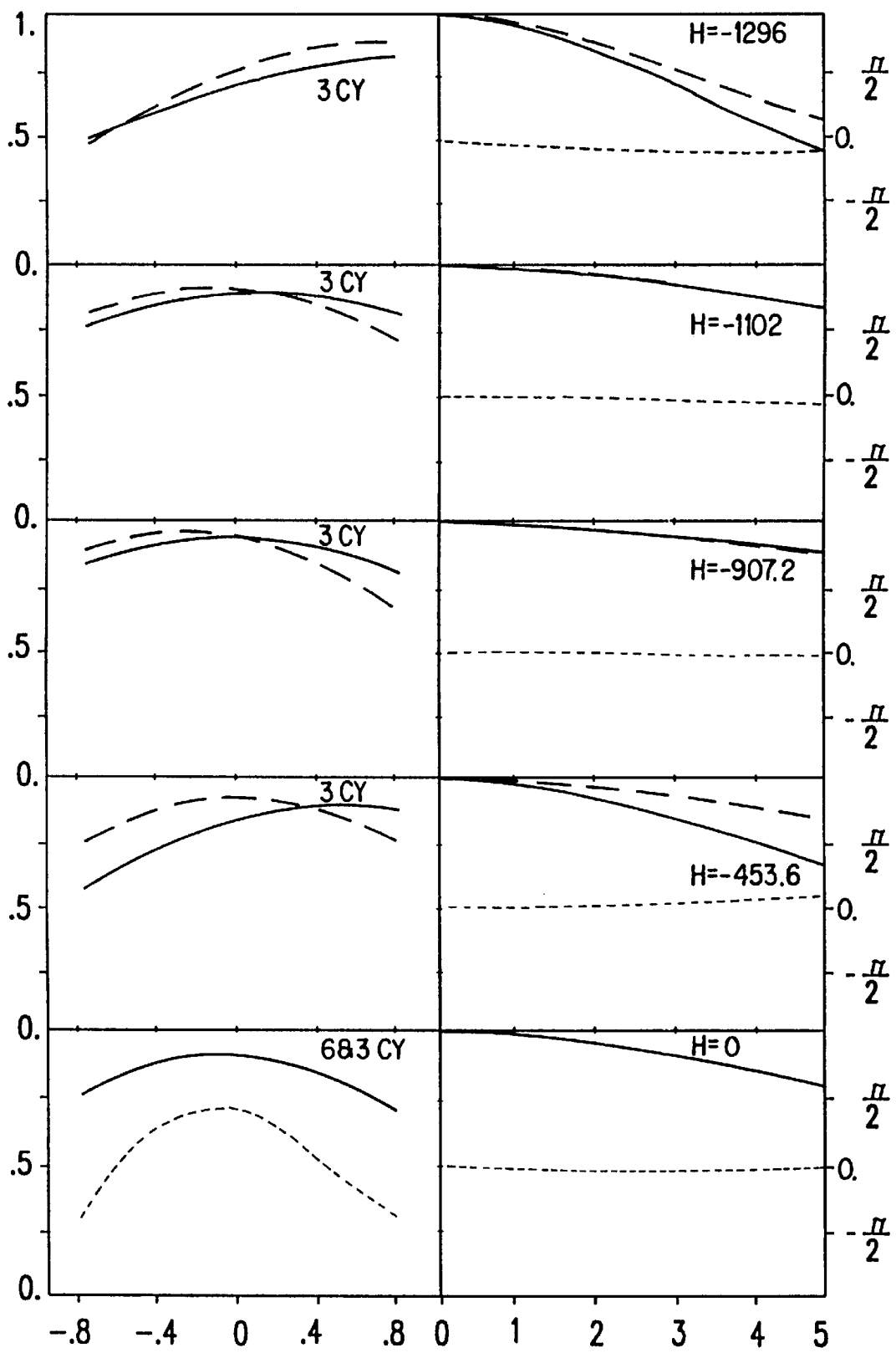
Figures 1, 1D:
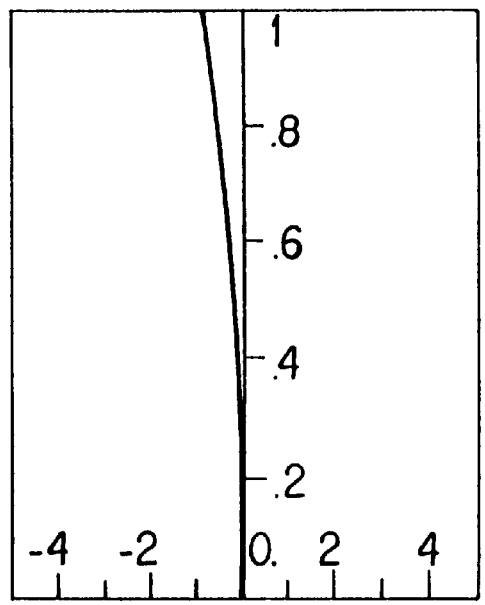
Figures 1, 1D, 2:
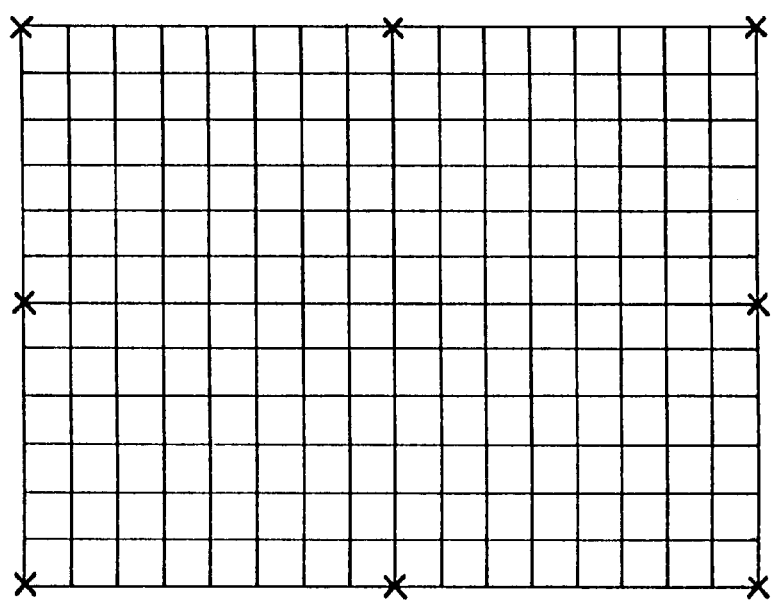
Figures 1, 1D, 2, 3:
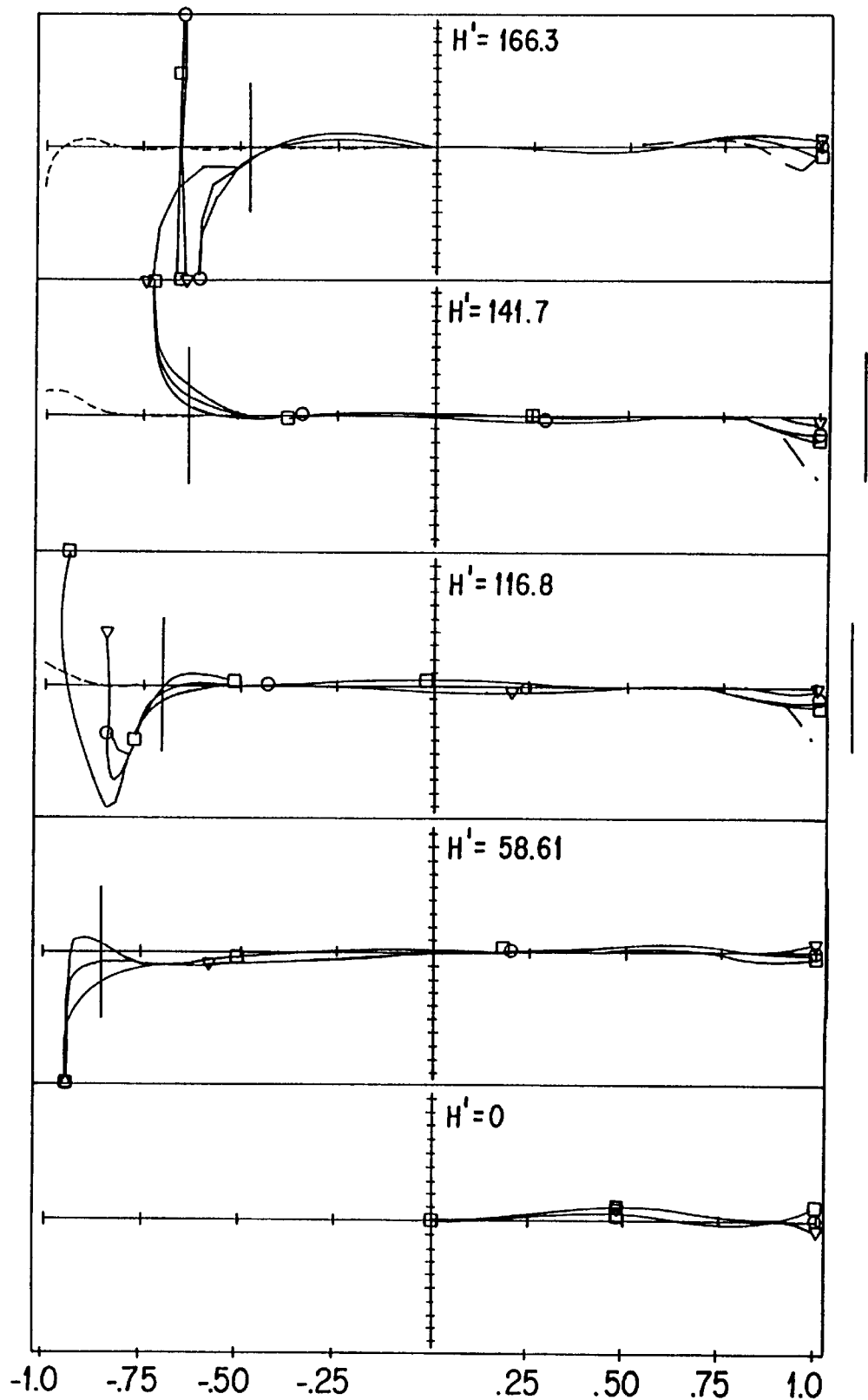
Figures 1, 1D, 2, 3, 4:
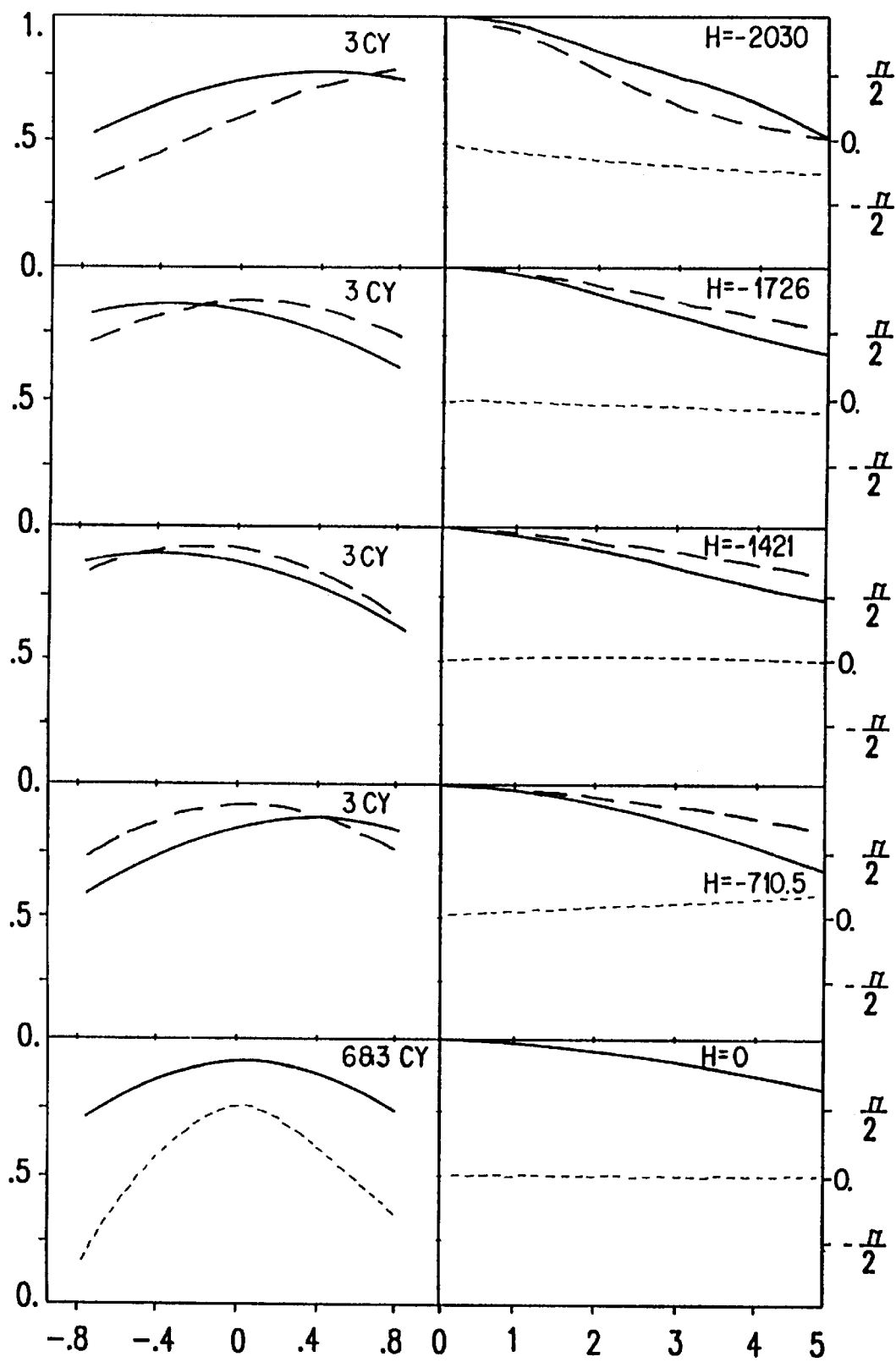
Figures 1, 1E:
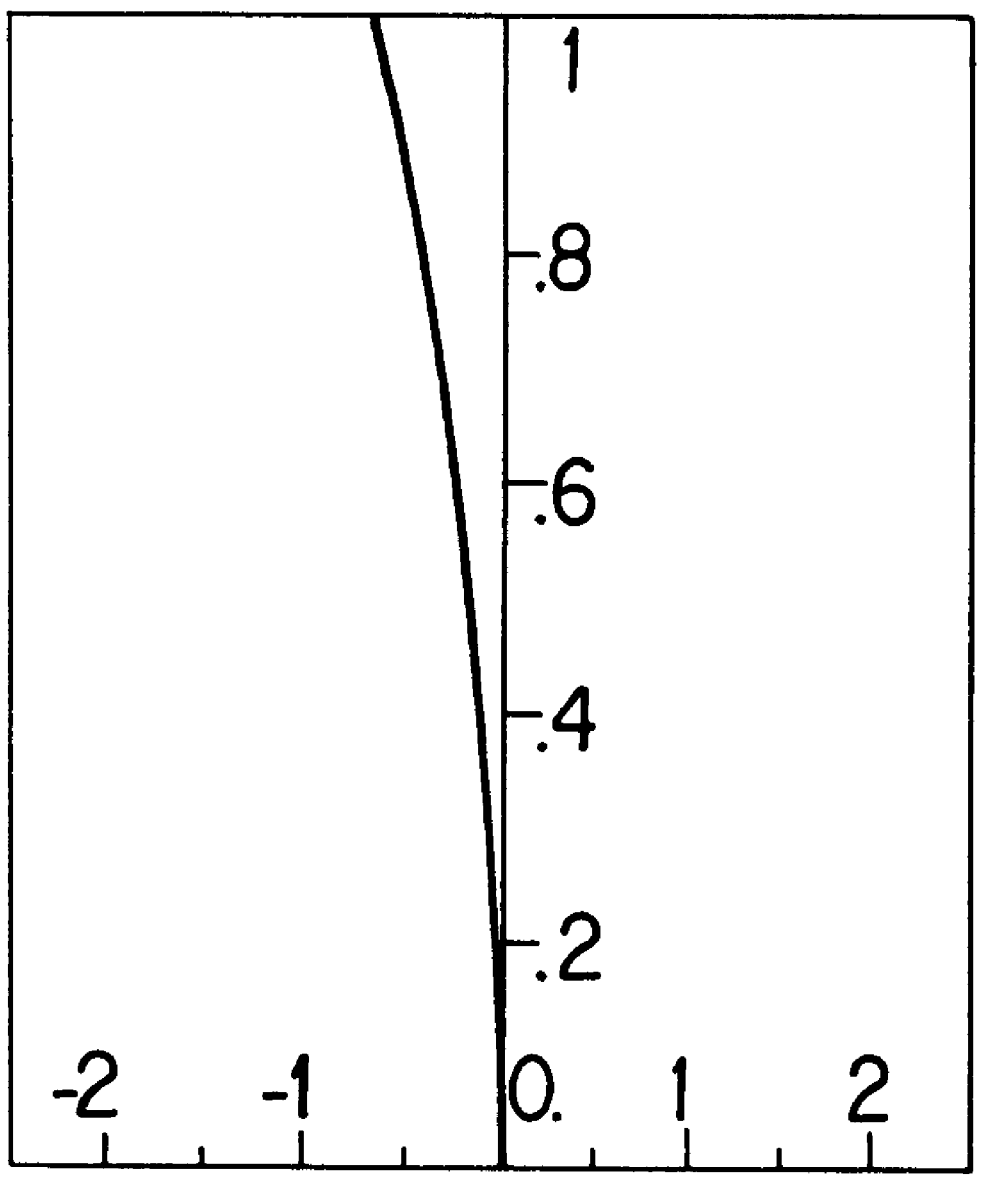
Figures 1, 1E, 2:
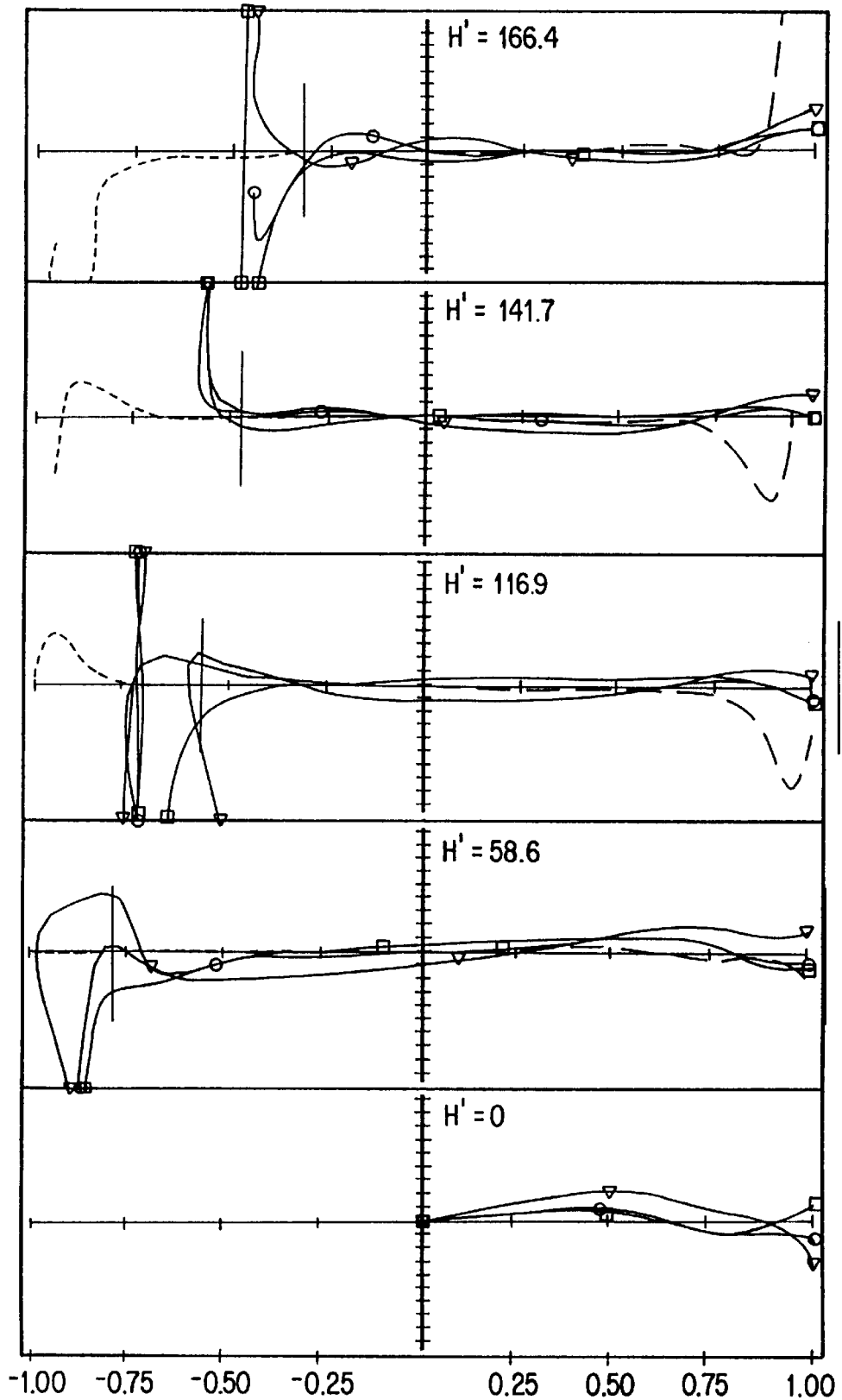

FIG. 1E repeats items 1 and 3 of FIG. 1C at a finer scale. Specifically, the vertical scale for the lateral aberration plots are 0.05 millimeters instead of 0.1 millimeters, as in FIG. 1C.

As shown by these figures, the projection lenses of the invention achieve a distortion which is less than about 1% and a lateral color correction which is better than about 100 microns. The lenses are thus suitable for use in data displays employing a pixelized panel having pixels whose characteristic size is around 200 microns.

Although specific embodiments of the invention have been described and illustrated, it is to be understood that a variety of modifications which do not depart from the scope and spirit of the invention will be evident to persons of ordinary skill in the art from the foregoing disclosure. The following claims are intended to cover the specific embodiments set forth herein as well as such modifications, variations, and equivalents.

TABLE 1

Lens Data

| Surf. No. | Type | Radius | Thickness | Glass | Clear Aperture Diameter |
|---|---|---|---|---|---|
| 1 | a | 258.9160 | 6.07000 | ACRYLIC | 111.93 |
| 2 | a | 56.6977 | 33.17298 | | 96.44 |
| 3 | ac | 76.3417 | 30.00000 | ACRYLIC | 94.50 |
| 4 | a | −148.4735 | 12.00000 | | 90.56 |
| 5 | | ∞ | 17.63170 | | 67.42 |
| 6 | a | −77.4000 | 4.38000 | STYRENE | 62.74 |
| 7 | a | 1611.6260 | 5.21125 | | 64.54 |
| 8 | | −162.8412 | 10.00000 | BACD18 | 64.94 |
| 9 | | −64.7685 | Space 1 | | 66.38 |
| 10 | | Aperture stop | Image distance | | 64.69 |

Symbol Description a - Polynomial asphere
c - Conic section

Conics

| Surface Number | Constant |
|---|---|
| 3 | −1.0000E + 00 |

Even Polynomial Aspheres

| Surf. No. | D | E | F | G | H | I |
|---|---|---|---|---|---|---|
| 1 | −2.6393E−07 | −1.1784E−11 | −1.3099E−14 | 2.2801E−18 | 4.4042E−22 | −9.4946E−26 |
| 2 | −7.8185E−08 | −5.9580E−11 | 5.9020E−15 | −7.3477E−17 | 2.5485E−20 | −5.4606E−24 |
| 3 | 6.0354E−07 | 1.3211E−10 | −2.7169E−15 | 8.6146E−18 | −4.2816E−22 | 1.5380E−24 |
| 4 | 1.7471E−07 | 1.4960E−10 | −2.8015E−14 | 1.6531E−17 | 5.4072E−21 | −2.6405E−24 |
| 6 | 2.7107E−07 | −6.2968E−10 | 1.1631E−13 | −1.3853E−16 | 3.0894E−19 | −1.7750E−22 |
| 7 | 6.5144E−07 | −3.7034E−10 | −4.3124E−13 | 9.3495E−16 | −5.5753E−19 | 1.0636E−22 |

Variable Spaces

| Focus Pos. | Space 1 T(9) | Focal Shift | Image Distance |
|---|---|---|---|
| 1 | 28.953 | −2.027 | 340.002 |
| 2 | 12.154 | −1.763 | 339.981 |
| 3 | −1.150 | −1.668 | 339.999 |

WAVELENGTHS 0.54610   0.48000   0.64380   0.43580   0.70652

SYSTEM FIRST ORDER PROPERTIES, POS 1

OBJ. HT: −887.00   f/ 5.75   MAG: −0.1900
STOP: 0.00 after surface 10.   DIA: 59.686
EFL: 284.718   FVD: 487.420   ENP: 107.304
IMD: 340.002   BRL: 147.418   EXP: 0.205198E − 12
OBD: −1672.75   OVL: 2160.17

SYSTEM FIRST ORDER PROPERTIES, POS 2

OBJ. HT: −1296.0   f/ 5.50   MAG: −0.1300
STOP: 0.00 after surface 10.   DIA: 62.406
EFL: 284.718   FVD: 470.602   ENP: 91.7840
IMD: 339.981   BRL: 130.620   EXP: 0.423090E − 12
OBD: −2364.38   OVL: 2834.98

SYSTEM FIRST ORDER PROPERTIES, POS 3

OBJ. HT: −2030.0   f/ 5.32   MAG: −0.0830
STOP: 0.00 after surface 10.   DIA: 64.548
EFL: 284.718   FVD: 457.315   ENP: 80.6553
IMD: 339.999   BRL: 117.316   EXP: −.11139OE − 12
OBD: −3604.58   OVL: 4061.89

TABLE 1-continued

First Order Properties of Elements

| Element Number | Surface Numbers | Power | f' | 1pp | 1'pp |
|---|---|---|---|---|---|
| 1 | 1 2 | −0.67311E−02 | −148.56 | 5.2558 | 1.1509 |
| 2 | 3 4 | 0.93573E−02 | 106.87 | 7.1355 | −13.878 |
| 3 | 6 7 | −0.80636E−02 | −124.01 | 0.12572 | −2.6178 |
| 4 | 8 9 | 0.62006E−02 | 161.27 | 9.7290 | 3.8696 |

TABLE 2

Lens Data

| Surf. No. | Type | Radius | Thickness | Glass | Clear Aperture Diameter |
|---|---|---|---|---|---|
| 1 | a | 322.33900 | 7.78851 | ACRYLIC | 117.87 |
| 2 | a | 70.5551 | 57.25451 | | 105.91 |
| 3 | ac | 148.1828 | 26.65211 | ACRYLIC | 96.42 |
| 4 | a | −162.4473 | 70.61526 | | 92.21 |
| 5 | a | −109.9940 | 5.62220 | STYRENE | 79.31 |
| 6 | a | −1692.0648 | 4.20967 | | 81.45 |
| 7 | | −250.0788 | 12.00000 | BACD5 | 81.58 |
| 8 | | −81.6808 | Space 1 | | 82.88 |
| 9 | | Aperture stop | Image distance | | 93.39 |

Symbol Description a - Polynomial asphere
c - Conic section

Conics

| Surface Number | Constant |
|---|---|
| 3 | −1.0000E + 00 |

Even Polynomial Aspheres

| Surf. No. | D | E | F | G | H | I |
|---|---|---|---|---|---|---|
| 1 | −2.0984E−07 | −7.5750E−11 | −3.0880E−15 | 2.7629E−18 | −7.2540E−23 | −6.6543E−26 |
| 2 | −1.2823E−07 | −1.2193E−10 | −4.4508E−14 | 2.9897E−18 | 4.0337E−21 | −9.6558E−25 |
| 3 | 4.0361E−07 | 6.0227E−11 | −1.1052E−14 | 1.8246E−18 | −2.5615E−22 | −1.3683E−25 |
| 4 | 3.1395E−07 | 1.1641E−10 | −4.6352E−14 | 1.9584E−17 | −4.4860E−22 | −1.4575E−26 |
| 5 | 9.4783E−07 | −6.4716E−10 | 3.8678E−14 | 1.8298E−16 | −1.0463E−19 | 1.8451E−23 |
| 6 | 9.4162E−07 | −5.7492E−10 | 1.2965E−14 | 2.0056E−16 | −1.1602E−19 | 2.1737E−23 |

Variable Spaces

| Focus Pos. | Space 1 T(8) | Focal Shift | Image Distance |
|---|---|---|---|
| 1 | −63.674 | −2.230 | 496.023 |
| 2 | −83.159 | −2.571 | 496.077 |
| 3 | −98.157 | −2.566 | 496.126 |

WAVELENGTHS

| 0.54610 | 0.48000 | 0.64380 | 0.43580 | 0.70652 |

SYSTEM FIRST ORDER PROPERTIES, POS 1

OBJ. HT: −887.00    f/  5.40 MAG:    −0.1900
STOP: 0.00 after surface 9. DIA: 92.647
EFL: 318.172            FVD: 616.491            ENP: 80.4136
IMD: 496.023            BRL: 120.468            EXP: −.549567E − 12
OBD: −1825.41           OVL: 2441.90

TABLE 2-continued

SYSTEM FIRST ORDER PROPERTIES, POS 2

OBJ. HT: −1296.0  f/ 5.40  MAG:  −0.1300
STOP: 0.00 after surface 9.  DIA: 92.842
EFL: 318.172  FVD: 597.060  ENP: 70.5605
IMD: 496.077  BRL: 100.983  EXP: −.359683E − 12
OBD: −2598.30  OVL: 3195.36

SYSTEM FIRST ORDER PROPERTIES, POS 3

OBJ. HT: −2030.0  f/ 5.40  MAG:  −0.0830
STOP: 0.00 after surface 9.  DIA: 92.878
EFL: 318.172  FVD: 582.111  ENP: 63.5305
IMD: 496.126  BRL: 85.9852  EXP: −.432690E − 12
OBD: −3984.22  OVL: 4566.33

First Order Properties of Elements

| Element Number | Surface Numbers | Power | f' | 1pp | 1'pp |
|---|---|---|---|---|---|
| 1 | 1  2 | −0.54081E−02 | −184.91 | 6.7450 | 1.4764 |
| 2 | 3  4 | 0.61882E−02 | 161.60 | 8.7611 | −9.6045 |
| 3 | 5  6 | −0.50506E−02 | −198.00 | −0.24540 | −3.7751 |
| 4 | 7  8 | 0.50048E−02 | 199.81 | 10.909 | 3.5631 |

TABLE 3

Lens Data

| Surf. No. | Type | Radius | Thickness | Glass | Clear Aperture Diameter |
|---|---|---|---|---|---|
| 1 | a | 605.1548 | 7.78851 | ACRYLIC | 102.93 |
| 2 | a | 70.9296 | 40.85381 | | 90.30 |
| 3 | | ∞ | 0.66700 | | 85.19 |
| 4 | ac | 124.7155 | 26.65211 | ACRYLIC | 87.70 |
| 5 | a | −144.4710 | 56.15536 | | 87.7 |
| 6 | a | −115.6453 | 5.62220 | STYRENE | 76.69 |
| 7 | a | 2804.7799 | 4.65586 | | 78.05 |
| 8 | | −271.4920 | 12.00000 | BACD5 | 78.20 |
| 9 | | −82.8601 | Space 1 | | 79.91 |
| 10 | | Aperture stop | Image distance | | 87.56 |

Symbol Description a - Polynomial asphere
c - Conic section

Conics

| Surface Number | Constant |
|---|---|
| 4 | −1.0000E + 00 |

Even Polynomial Aspheres

| Surf. No. | D | E | F | G | H | I |
|---|---|---|---|---|---|---|
| 1 | −1.2973E−07 | −3.2066E−11 | −1.6426E−15 | 8.3786E−19 | 1.8877E−22 | −5.5531E−26 |
| 2 | 6.8218E−10 | −2.7966E−11 | −4.1719E−14 | −9.0336E−19 | 4.1090E−21 | −1.2373E−24 |
| 4 | 2.7451E−07 | 2.5026E−11 | 2.3591E−14 | −2.0105E−18 | −1.7975E−22 | −1.3135E−24 |
| 5 | 1.7168E−07 | 6.8612E−11 | −3.1702E−15 | 6.5307E−18 | 1.3851E−21 | 9.1951E−25 |
| 6 | 1.0298E−06 | −6.3761E−10 | 1.0583E−13 | 9.3309E−17 | −5.7638E−20 | 8.7325E−24 |
| 7 | 1.0333E−06 | −5.7606E−10 | −3.5169E−15 | 2.4614E−16 | −1.5227E−19 | 3.0756E−23 |

Variable Spaces

| Focus Pos. | Space 1 T(9) | Focal Shift | Image Distance |
|---|---|---|---|
| 1 | −33.000 | −3.599 | 460.145 |
| 2 | −52.000 | −3.414 | 460.070 |

TABLE 3-continued

| | | | |
|---|---|---|---|
| 3 | −67.000 | −3.289 | 460.109 |

WAVELENGTHS

| | | | | |
|---|---|---|---|---|
| 0.54610 | 0.48000 | 0.64380 | 0.43580 | 0.70652 |

SYSTEM FIRST ORDER PROPERTIES, POS 1

OBJ. HT: −887.00     f/   5.58   MAG:    −0.1900
STOP: 0.00 after surface 10.   DIA: 83.388
EFL: 320.995          FVD: 581.540          ENP: 80.0929
IMD: 460.145          BRL: 121.395          EXP: −.461737E − 12
OBD: −1865.18         OVL: 2446.72

SYSTEM FIRST ORDER PROPERTIES, POS 2

OBJ. HT: −1296.0     f/   5.32   MAG:    −0.1300
STOP: 0.00 after surface 10.   DIA: 87.481
EFL: 320.995          FVD: 562.465          ENP: 68.5677
IMD: 460.070          BRL: 102.395          EXP: 0.192812E − 12
OBD: −2644.93         OVL: 3207.39

SYSTEM FIRST ORDER PROPERTIES, POS 3

OBJ. HT: −2030.0     f/   5.32   MAG:    −0.0830
STOP: 0.00 after surface 10.   DIA: 87.563
EFL: 320.995          FVD: 547.504          ENP: 60.1772
IMD: 460.109          BRL: 87.3948          EXP: 0.112053E − 12
OBD: −4043.14         OVL: 4590.65

First Order Properties of Elements

| Element Number | Surface Numbers | | Power | f' | 1pp | 1'pp |
|---|---|---|---|---|---|---|
| 1 | 1 | 2 | −0.61130E−02 | −163.59 | 5.9358 | 0.69573 |
| 2 | 4 | 5 | 0.71322E−02 | 140.21 | 8.5473 | −9.9012 |
| 3 | 6 | 7 | −0.53606E−02 | −186.55 | 0.13949 | −3.3830 |
| 4 | 8 | 9 | 0.50764E−02 | 196.99 | 10.602 | 3.2358 |

TABLE 4

MATERIALS TABLE

| NAME | $N_e$ | $V_e$ |
|---|---|---|
| Acrylic | 1.4938 | 56.9 |
| Styrene | 1.5949 | 30.7 |
| BACD18 | 1.6413 | 55.2 |
| BACD5 | 1.5914 | 61.0 |

TABLE 5

PARAMETERS OF FIGURES

| Figure | Focal Length | Magnification | F/Number | Object Height | Image Height |
|---|---|---|---|---|---|
| FIG. 1B-1–1B-4 | 284.72 | −0.190 | 5.75 | −887.00 | 166.51 |
| FIG. 1C-1–1C-4 | 284.72 | −0.130 | 5.50 | −1296.00 | 166.43 |
| FIG. 1D-1–1D-4 | 284.72 | −0.083 | 5.32 | −2030.00 | 166.35 |
| FIG. 1E-1–1E-2 | 284.47 | −0.130 | 5.50 | −1296.00 | 166.44 |
| FIG. 2B-1–2B-4 | 318.17 | −0.190 | 5.40 | −887.00 | 166.25 |
| FIG. 2C-1–2C-4 | 318.17 | −0.130 | 5.40 | −1296.00 | 165.77 |
| FIG. 2D-1–2D-4 | 318.17 | −0.083 | 5.40 | −2030.00 | 165.46 |
| FIG. 3B-1–3B-4 | 320.99 | −0.190 | 5.58 | −887.00 | 165.81 |
| FIG. 3C-1–3C-4 | 320.99 | −0.130 | 5.32 | −1296.00 | 165.59 |
| FIG. 3D-1–3D-4 | 320.99 | −0.083 | 5.32 | −2030.00 | 165.44 |

TABLE 6

PARAMETERS OF FIGURES

| Figure | Scale: Unit | Circular Data Points | Triangular Data Points | Square Data Points |
|---|---|---|---|---|
| FIG. 1B-3 | .100 | .546 | .480 | .644 |
| FIG. 1C-3 | .100 | .546 | .480 | .644 |
| FIG. 1D-3 | .100 | .546 | .480 | .644 |
| FIG. 1E-2 | .050 | .546 | .465 | .644 |
| FIG. 2B-3 | .100 | .546 | .480 | .644 |
| FIG. 2C-3 | .100 | .546 | .480 | .644 |
| FIG. 2D-3 | .100 | .546 | .480 | .644 |
| FIG. 3B-3 | .100 | .546 | .480 | .644 |
| FIG. 3C-3 | .100 | .546 | .480 | .644 |
| FIG. 3D-3 | .100 | .546 | .480 | .644 |

TABLE 7

PARAMETERS OF FIGURES

Figures 1, 3B:
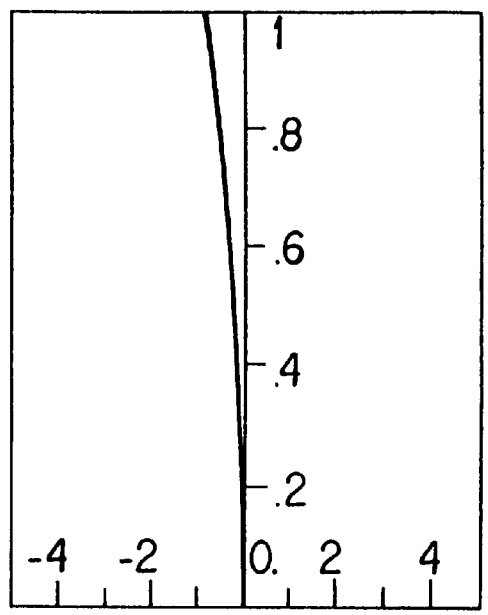
Figures 2, 3B:
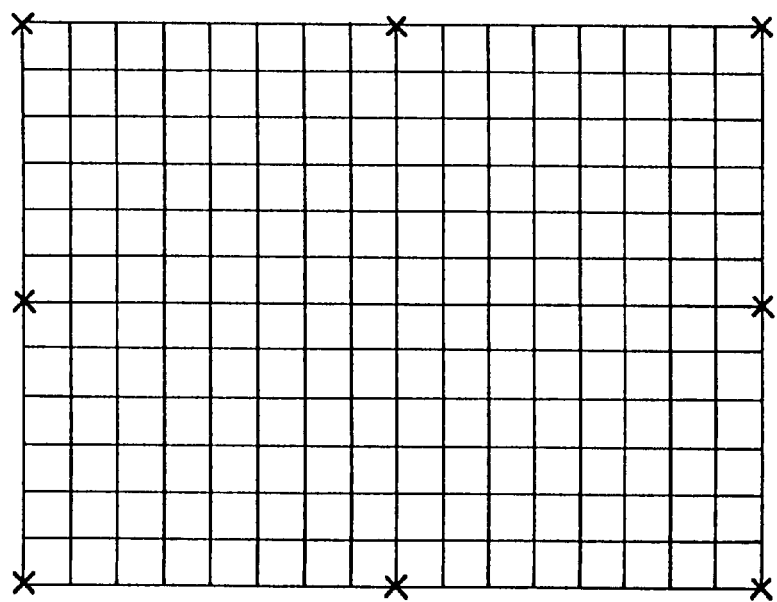
Figures 3, 3B:
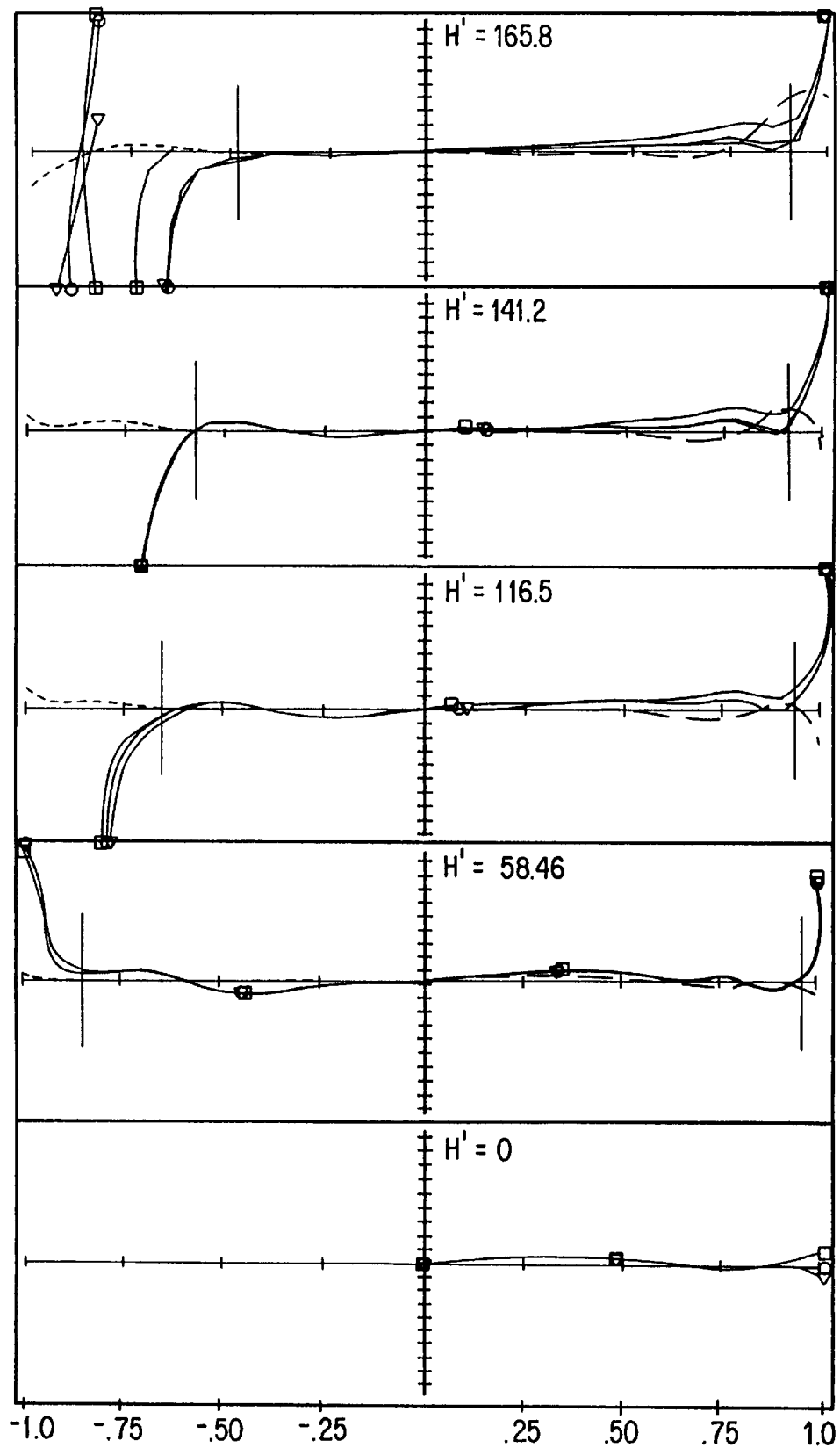
Figures 3, 3B, 4:
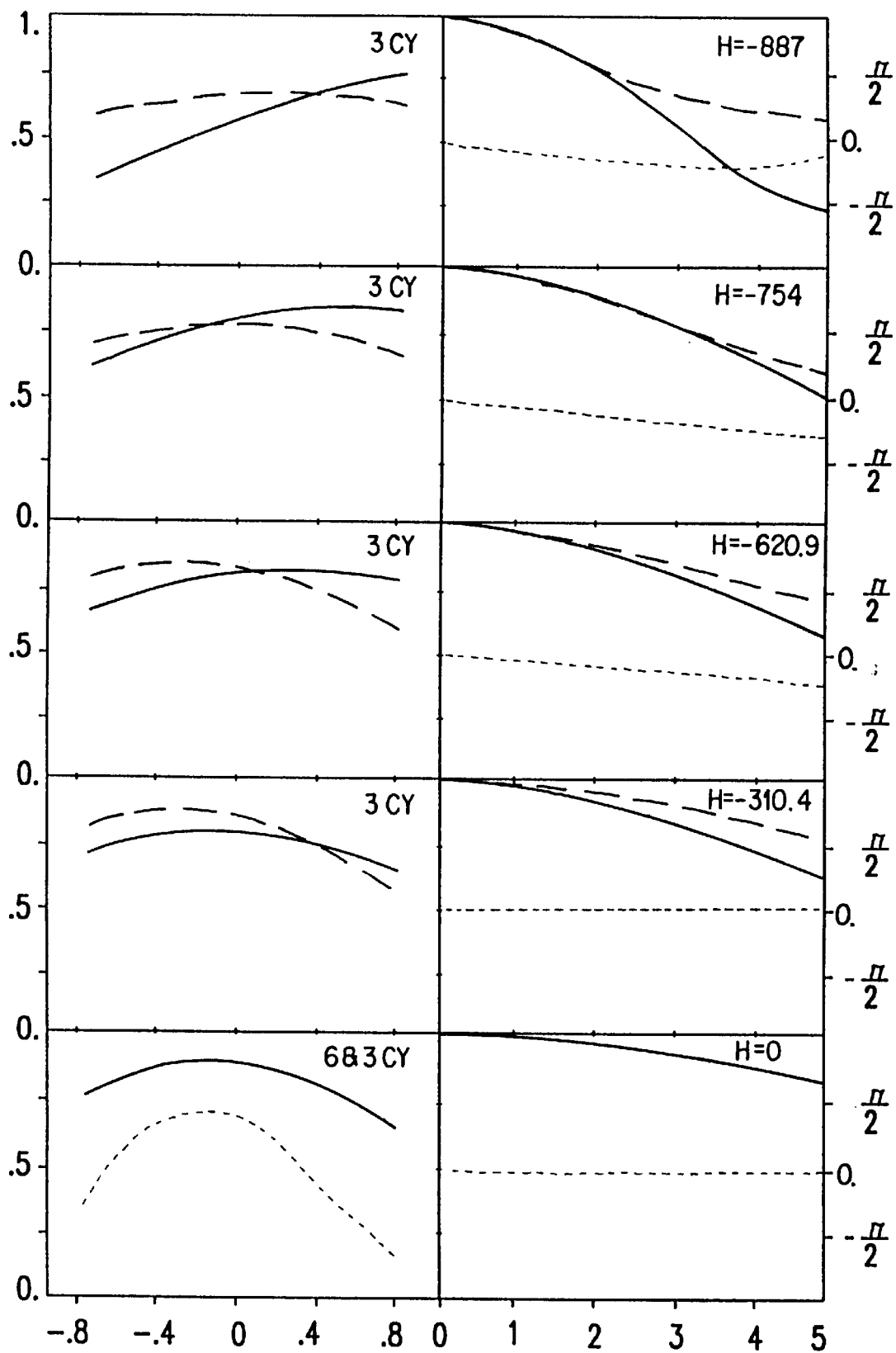

| Figure | At Focus | Wavelengths | Weights |
|---|---|---|---|
| FIG. 1B-4 | .050 | .546 | 1.0 |
| FIG. 1C-4 | .000 | .546 | 1.0 |
| FIG. 1D-4 | .100 | .546 | 1.0 |
| FIG. 2B-4 | −.390 | .546 | 1.0 |
| FIG. 2C-4 | .122 | .546 | 1.0 |
| FIG. 2D-4 | .251 | .546 | 1.0 |
| FIG. 3B-4 | −.177 | .546 | 1.0 |

TABLE 7-continued

PARAMETERS OF FIGURES

Figures 1, 3C:
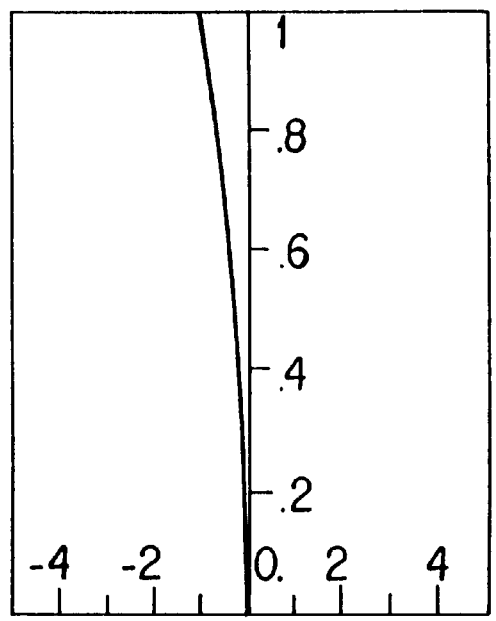
Figures 2, 3C:
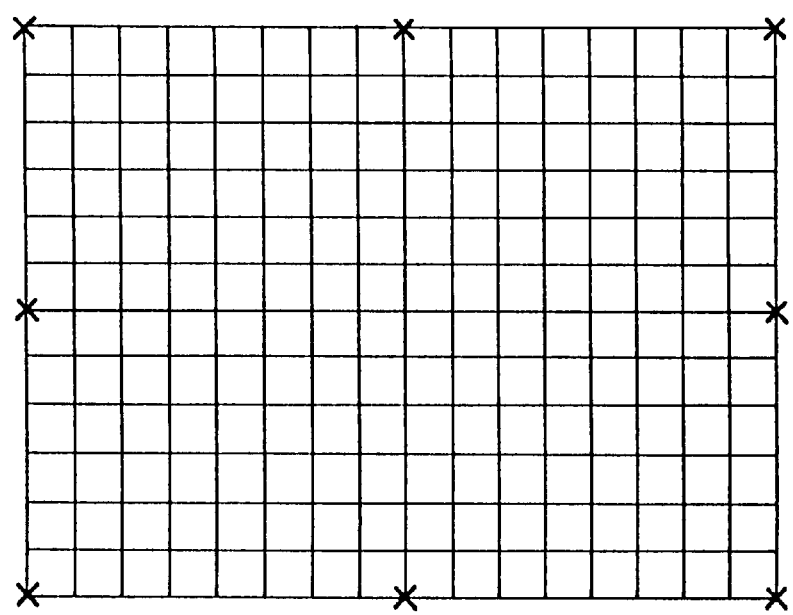
Figures 3, 3C:
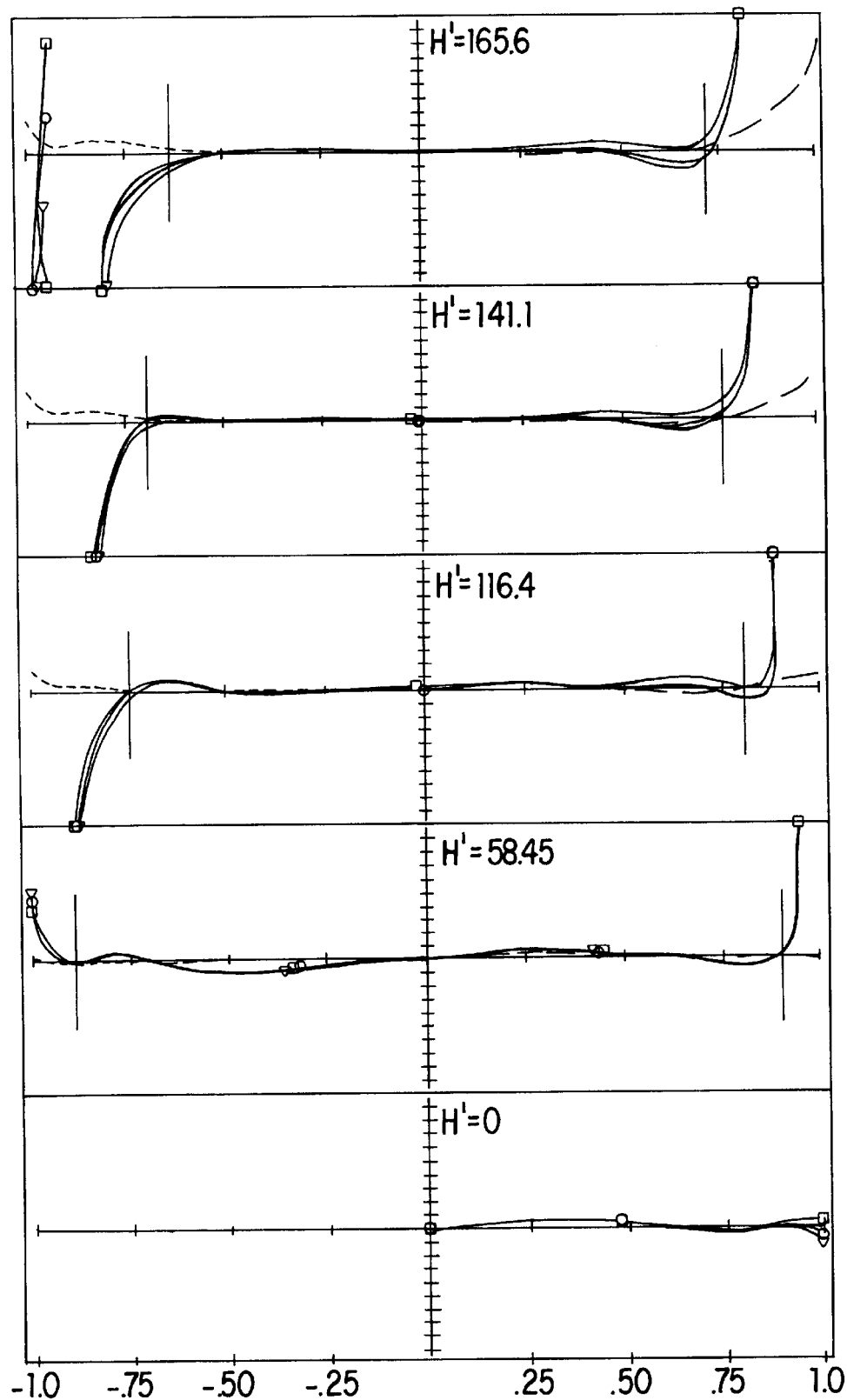
Figures 3, 3C, 4:
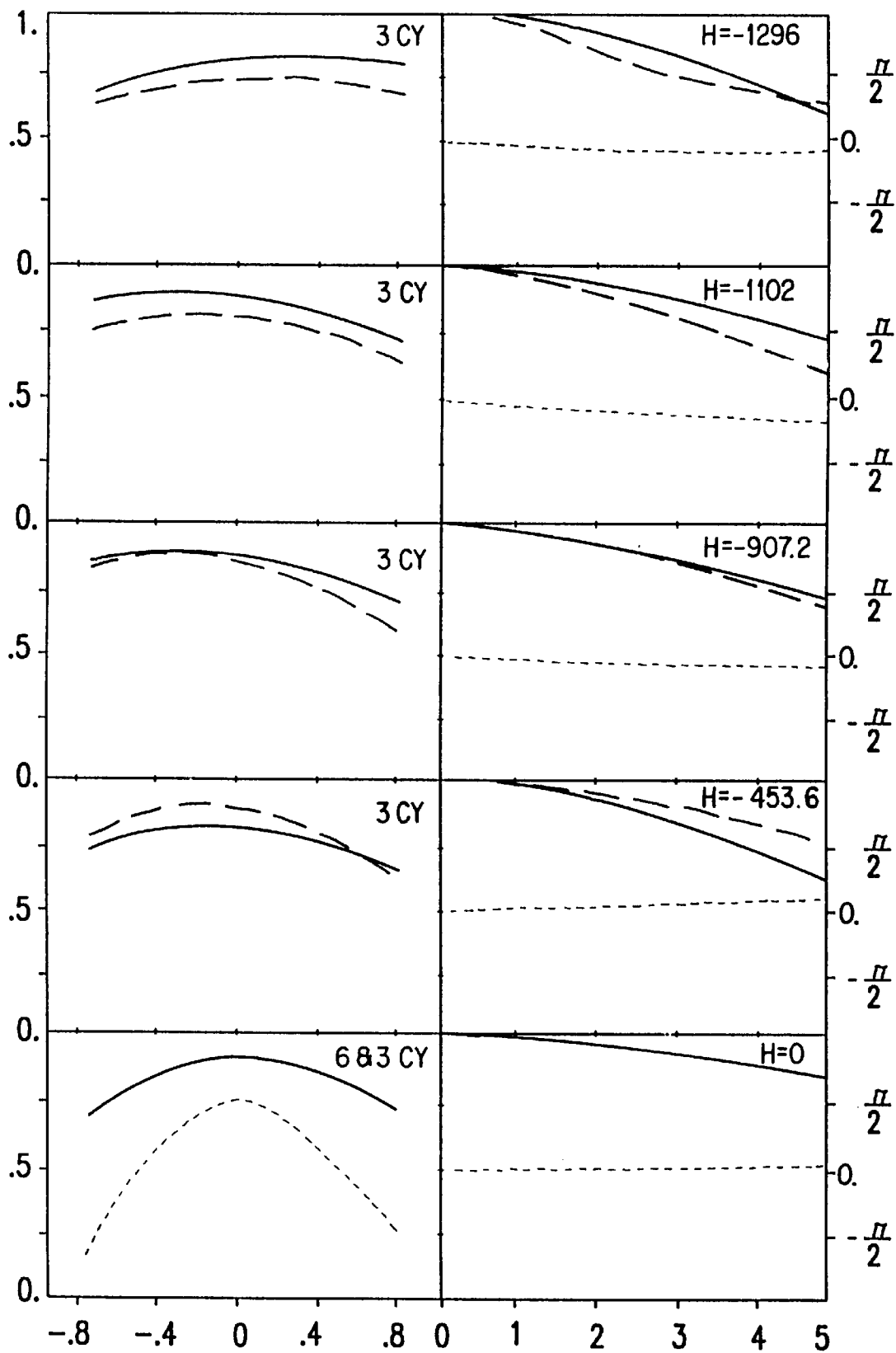
Figures 1, 3D:
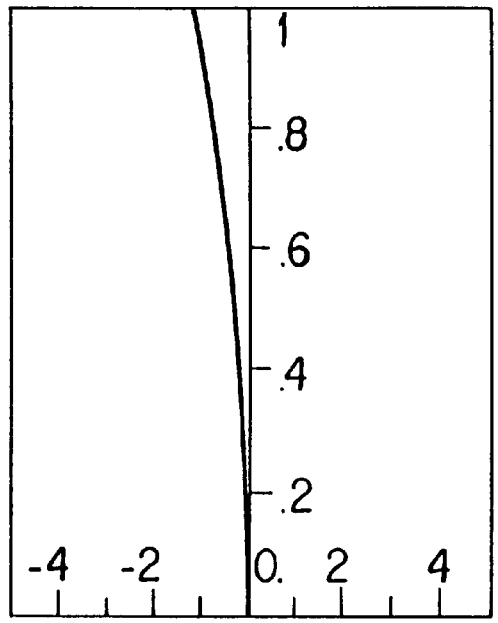
Figures 2, 3D:
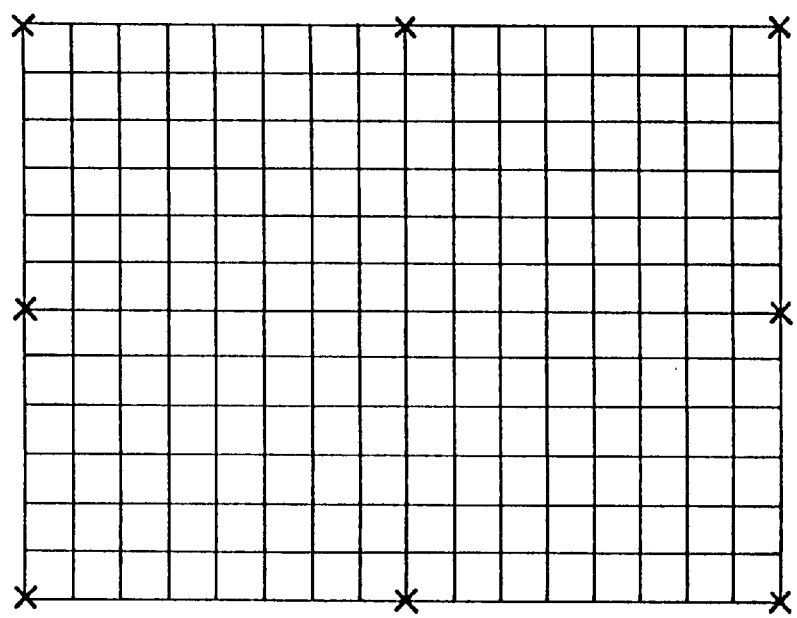
Figures 3, 3D:
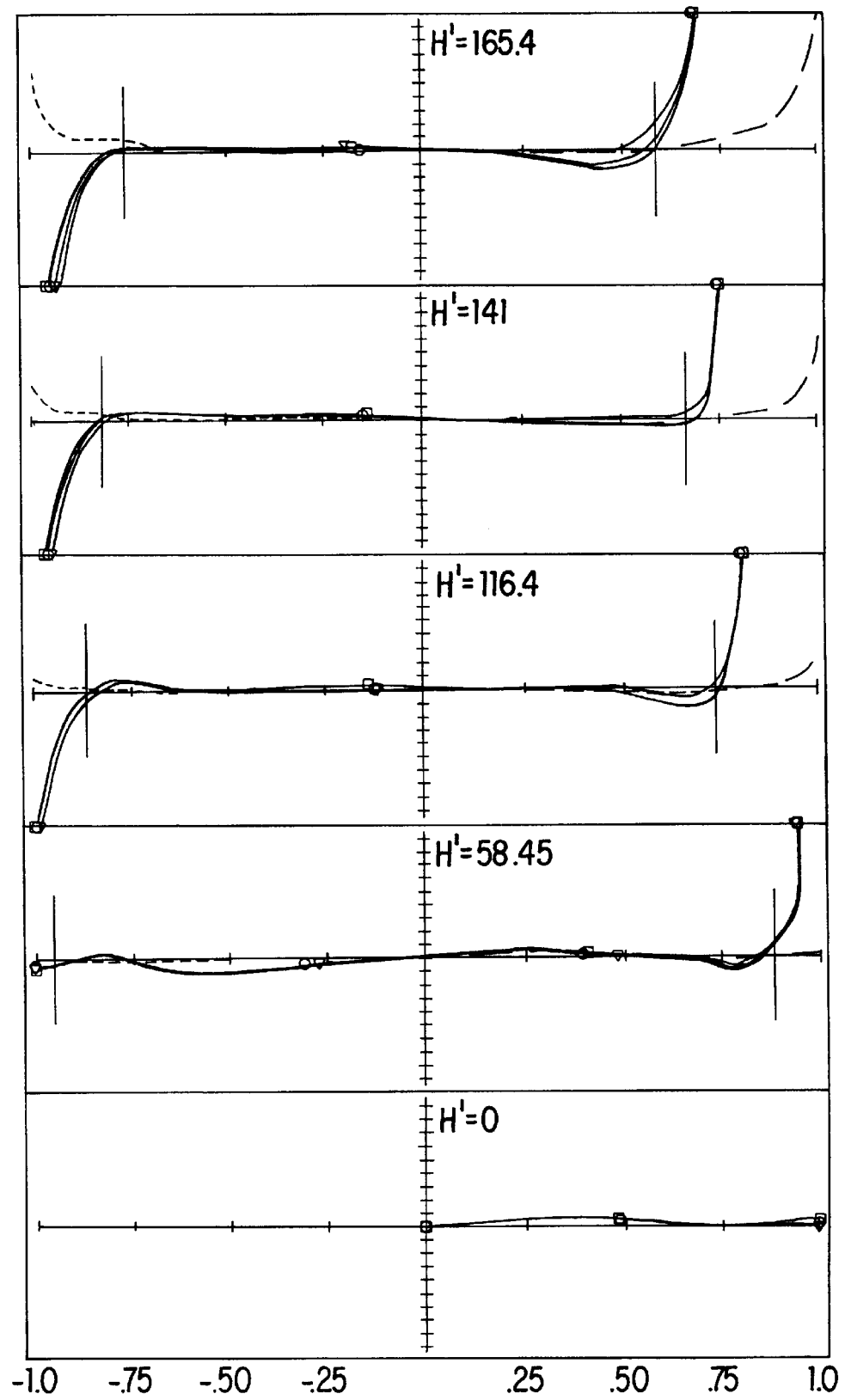
Figures 3, 3D, 4:
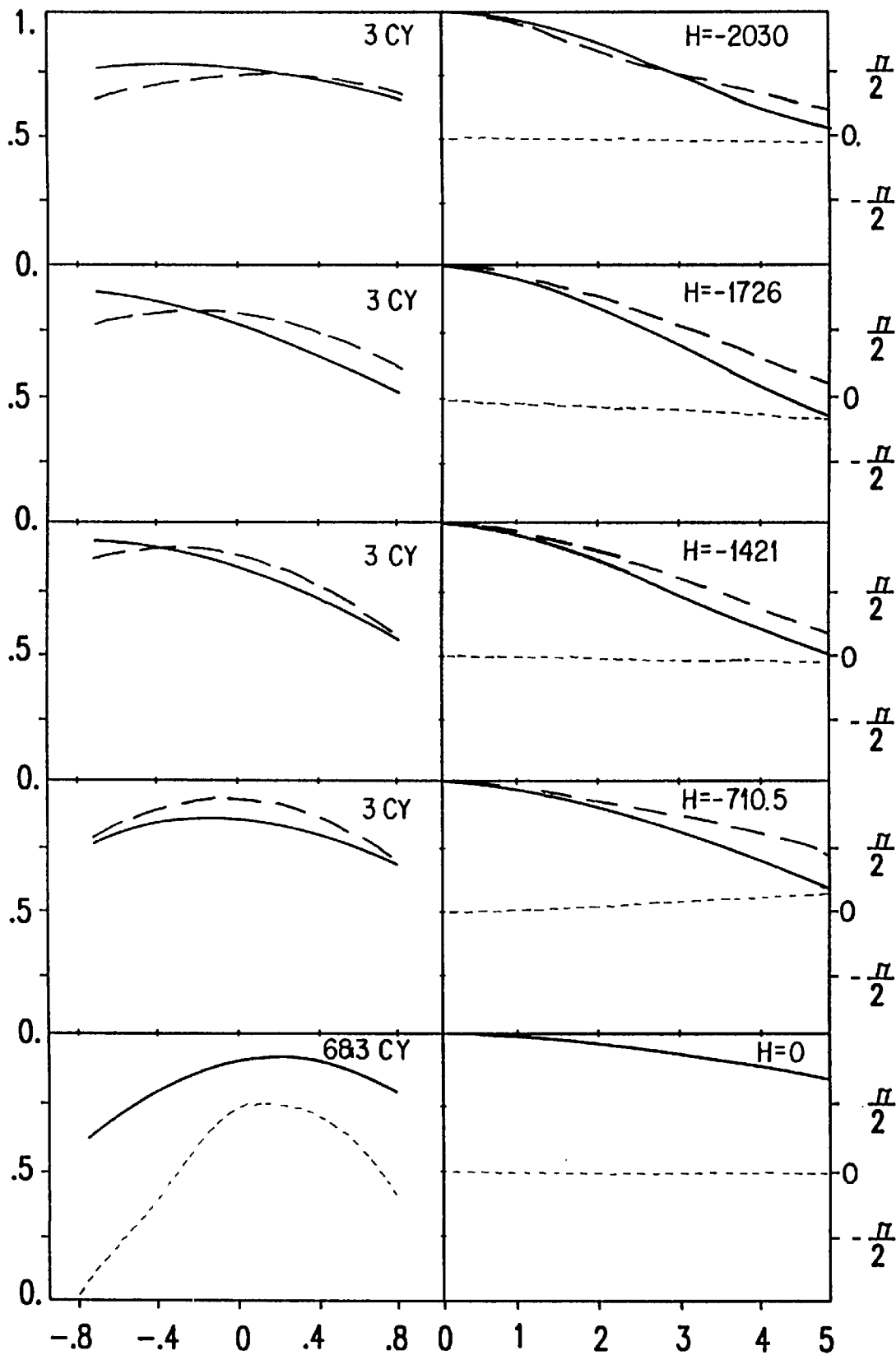
Figure 4:
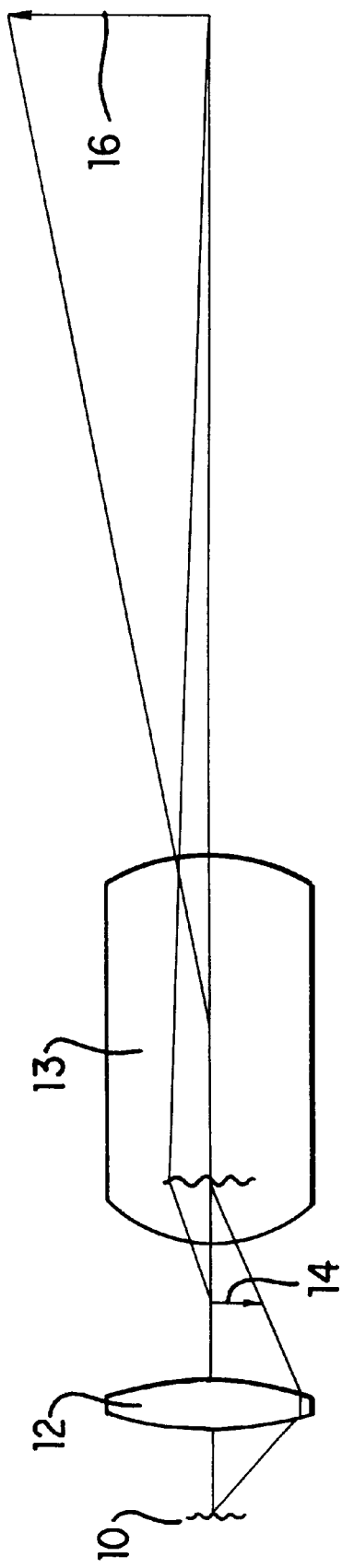

| Figure | At Focus | Wavelengths | Weights |
|---|---|---|---|
| FIG. 3C-4 | -.009 | .546 | 1.0 |
| FIG. 3D-4 | .154 | .546 | 1.0 |

What is claimed is:

1. A projection lens for forming an image of an object, said lens consisting in order from its image end to its object end of:
   (a) a first low dispersion, plastic lens element having a negative power and a V-value $V_1$;
   (b) a second low dispersion, plastic lens element having a positive power and a V-value $V_2$;
   (c) a third high dispersion, plastic lens element having a negative power and a V-value $V_3$; and
   (d) a fourth low dispersion lens element having a V-value $V_4$;
   wherein $V_3$ is less than each of $V_1$, $V_2$, and $V_4$.

2. The projection lens of claim 1 wherein the magnitude of the power of the second lens element is greater than the magnitude of the power of each of the first, third, and fourth lens elements.

3. A projection lens for forming an image of an object, said lens comprising in order from its image end to its object end:
   (a) a first low dispersion, plastic lens element having a negative power and a V-value $V_1$;
   (b) a second low dispersion, plastic lens element having a positive power and a V-value $V_2$;
   (c) a third high dispersion, plastic lens element having a negative power and a V-value $V_3$; and
   (d) a fourth low dispersion lens element having a V-value $V_4$;
   wherein the magnitude of the power of the second lens element is greater than the magnitude of the power of each of the first, third, and fourth lens elements and wherein $V_3$ is less than each of $V_1$, $V_2$, and $V_4$.

4. The projection lens of claim 1 or 3 wherein
   the first lens element is an acrylic lens element,
   the second lens element is an acrylic lens element,
   the third lens element is a styrene lens element, and
   the fourth lens element is a crown glass element.

5. The projection lens of claim 1 or 3 wherein the fourth lens element has a positive power.

6. The projection lens of claim 5 wherein the combined power of the third and fourth lens elements is negative.

7. The projection lens of claim 1 or 3 wherein the lens has a back focal length which does not change substantially as the lens is heated from room temperature to its operating temperature.

8. The projection lens of claim 1 or 3 wherein each of the first, second, and third lens elements has at least one aspherical surface.

9. The projection lens of claim 1 or 3 wherein each of the first, second, and third lens elements has two aspherical surfaces.

10. The projection lens of claim 1 or 3 wherein the fourth lens element is a glass lens element and has two spherical surfaces.

11. The projection lens of claim 1 or 3 wherein the object is a pixelized panel and the lens has a focal length greater than the largest dimension of the panel.

12. The projection lens of claim 11 wherein the lens has a back focal length which is greater than the lens' focal length.

13. The projection lens of claim 1 or 3 wherein the lens has a lateral color aberration which is less than about 100 microns at the object.

14. The projection lens of claim 1 or 3 wherein the lens has a distortion which is less than about one percent at the image.

15. A projection lens system for forming an image of an object, said system comprising:
   (a) an illumination system comprising a light source and illumination optics which forms an image of the light source, said image being the output of the illumination system;
   (b) a pixelized panel which comprises the object; and
   (c) a projection lens comprising the projection lens of claim 1 or 3, said projection lens having an entrance pupil whose location substantially corresponds to the location of the output of the illumination system.

16. A variable magnification projection lens system for forming an image of an object, said system comprising:
   (a) an illumination system comprising a light source and illumination optics which forms an image of the light source, said image being the output of the illumination system;
   (b) a pixelized panel which comprises the object; and
   (c) a projection lens comprising the projection lens of claim 1 or 3, said projection lens having an entrance pupil whose location substantially corresponds to the location of the output of the illumination system,
   wherein the magnification of the projection lens system is varied by changing the distance between the last lens surface of the projection lens and the pixelized panel while holding the lens' entrance pupil substantially fixed at the location of the output of the illumination system.

* * * * *

UNITED STATES PATENT AND TRADEMARK OFFICE
CERTIFICATE OF CORRECTION

PATENT NO. : 5,963,375
DATED : October 5, 1999
INVENTOR(S) : Melvyn H. Kreitzer

It is certified that error appears in the above-identified patent and that said Letters Patent is hereby corrected as shown below:

| Col. | Table | Description |
|---|---|---|
| 11 | 2 | Under <u>Even Polynomial Aspheres</u>, Surf. No. 1, Column F, delete minus sign |
| 11 | 2 | Under <u>Even Polynomial Aspheres</u>, Surf. No. 4, Column F, "-4.6352E-14" should be "-4.3652E-14" |
| 11 | 2 | Under <u>Even Polynomial Aspheres</u>, Surf. No. 3, Column H, delete minus sign, and "22" should be --21--. |
| 14 | 3 | Under <u>Lens Data</u>, Surf. No. 5, last column, "87.7" should be "87.17" |
| 14 | 3 | Under <u>Even Polynomial Aspheres</u>, Surf. No. 4, Column I, delete minus sign |

Signed and Sealed this

Eighth Day of August, 2000

Attest:

Q. TODD DICKINSON

*Attesting Officer*  *Director of Patents and Trademarks*